United States Patent [19]

Craig

[11] 4,254,468

[45] Mar. 3, 1981

[54] TYPESETTER CHARACTER GENERATING APPARATUS

[75] Inventor: Roderick I. Craig, Cheltenham, England

[73] Assignee: Eltra Corporation, Toledo, Ohio

[21] Appl. No.: 35,487

[22] Filed: May 3, 1979

Related U.S. Application Data

[62] Division of Ser. No. 905,451, May 12, 1978, Pat. No. 4,199,815.

[51] Int. Cl.³ .......................... G06F 3/14; G08B 5/36; B41B 19/00

[52] U.S. Cl. .................................... 364/523; 315/365; 340/730; 340/735; 340/750; 354/12; 364/521

[58] Field of Search ....................... 364/523, 521, 855; 340/730, 735, 744, 748, 749, 750, 146.3 A; 354/7, 12, 13; 360/48; 315/365

[56] References Cited

U.S. PATENT DOCUMENTS

| | | | |
|---|---|---|---|
| 3,305,841 | 2/1967 | Schwartz | 340/748 X |
| 3,471,848 | 10/1969 | Manber | 340/748 |
| 3,553,676 | 1/1971 | Raciti | 340/744 X |
| 3,568,178 | 3/1971 | Day | 178/15 |
| 3,735,389 | 5/1973 | Tarczy-Hornoch | 364/718 X |
| 3,930,251 | 12/1975 | Salava et al. | 364/523 |
| 3,946,365 | 3/1976 | Bantner | 354/7 X |
| 4,029,947 | 6/1977 | Evans et al. | 364/523 X |
| 4,038,493 | 7/1977 | Richards | 178/15 |

FOREIGN PATENT DOCUMENTS

| | | | |
|---|---|---|---|
| 1122725 | 8/1968 | United Kingdom | 364/523 |
| 1153563 | 5/1969 | United Kingdom | 364/523 |
| 1207542 | 10/1970 | United Kingdom | 364/523 |
| 1240190 | 7/1971 | United Kingdom | 364/523 |
| 1353125 | 5/1974 | United Kingdom | 364/523 |
| 1393653 | 5/1975 | United Kingdom | 364/523 |

*Primary Examiner*—Joseph F. Ruggiero
*Attorney, Agent, or Firm*—Joel I. Rosenblatt

[57] ABSTRACT

A font storage system for use in a typesetter having an electronically controlled character imaging device. The storage system, which preferably includes a floppy disk, has digital information stored thereon defining each character to be typeset by at least two outlines on a normalized X-Y grid. The digital information defining each character includes (1) digital numbers defining the X and Y coordinates of the initial start points of the outline and (2) digital numbers defining a plurality of straight line vectors extending successively along the character outlines. Each vector has a first digital number representing the X coordinate and a second digital number representing the Y coordinate distance from one end of the vector to the other.

5 Claims, 42 Drawing Figures

CHARACTER DATA BLOCK

HEADER WORD

| | | | | | | | |
|---|---|---|---|---|---|---|---|
| $X_7$ | $X_6$ | $X_5$ | $X_4$ | $X_3$ | $X_2$ | $X_1$ | $X_0$ |
| $N_3$ | $N_2$ | $N_1$ | $N_0$ | K | C | T | $X_8$ |

START POINT WORD

| | | | | | | | |
|---|---|---|---|---|---|---|---|
| $Y_7$ | $Y_6$ | $Y_5$ | $Y_4$ | $Y_3$ | $Y_2$ | $Y_1$ | $Y_0$ |
| $X_3$ | $X_2$ | $X_1$ | $X_0$ | D | S | $Y_9$ | $Y_8$ |

VECTOR BYTE

| | | | | | | | |
|---|---|---|---|---|---|---|---|
| $X_3$ | $X_2$ | $X_1$ | $X_0$ | $Y_3$ | $Y_2$ | $Y_1$ | $Y_0$ |

CONTROL BYTE

| | | | | | | | |
|---|---|---|---|---|---|---|---|
| Ø | Ø | Ø | Ø | $M_3$ | $M_2$ | $M_1$ | $M_0$ |

CHARACTER DATA BLOCK

| | |
|---|---|
| Character # | # of Outlines |
| YN data word | |
| XN data word | |
| dydx N, A | dydx N,B |
| ⋮ | |
| dydx N,Q | Null |
| YN-1 data word | |
| XN-1 data word | |
| dydx N-1, A | dydx N-1,B |
| ⋮ | |
| dydx 1, Q-1 | dydx 1, Q |

FIG. 9A

Y DATA WORD

MSB ... LSB

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | K | | | | YN | | | | | | | | | |

FIG. 9B

X DATA WORD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| E | ± | XN | | | | | | | | | | O | F | B | L |

FIG. 9C

VECTOR/CONTROL WORD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| dy | | | | dx | | | | dy | | | | dx | | | |

FIG. 9D

TYPESETTER CHARACTER GENERATING APPARATUS

This is a division of application Ser. No. 905,451, filed May 12, 1978, now U.S. Pat. No. 4,199,815.

BACKGROUND OF THE INVENTION

The present invention relates to the art of generating alphanumeric characters or other symbols for reproduction by a cathode ray tube (CRT), a laser beam scanner or other flying spot character imaging device which is capable of being electronically controlled. More particularly, the present invention concerns a font storage system for use in a character generator whereby a font of characters or other symbols are stored in a digital code.

The field of automated typesetting has experienced ever-accelerating advances since Ottmar Mergenthaler developed the Linotype ® machine for semi-automatically producing lines of type. The Linotype machine and its progeny of "hot metal" typesetters have been called the first generation of automatic typesetters. These typesetters were refined over the years and are still in use in some locations.

The second generation of typesetters, which were pioneered by René Higonnet and Louis Moyroud, among others, are called photo-mechanical typesetters, or simply phototypesetters. In these machines, one or more fonts of characters are arranged on a photographic negative. Selected characters are automatically projected through an optical system and positioned in a line on photographic film. Not only are these phototypesetters now less expensive than their first generation parents, but refinements in the machines led to faster speed, better quality and greater typographic flexibility. Phototypesetters are currently enjoying a period of maximum use in the graphic arts industry, but are being improved upon by third generation machines: the so-called CRT (and laser) typesetters.

In CRT typesetters characters are electronically generated and written onto photographic film, thus eliminating most of the mechanical movements characteristic of second generation phototypesetters. This change from mechanics to electronics is resulting in still faster speed and greater typographic flexibility, as well as less frequent adjustments and fewer changes in "font dressings" or stored fonts which are necessary on all second generation typesetters. The CRT typesetters are, as a rule, more expensive than their second generation counterparts so that, while they have become the dominant machines in the newspaper market, they are only just beginning to gain significance in non-newspaper applications. It is expected, however, that the price of CRT typesetters will come down as volume increases and new machines are developed to take advantage of advances in electronic circuit technology.

There are generally two methods by which character fonts are stored in third generation typesetters. The so-called "analog" machines store the character masters on photographic film grids. These masters are scanned with a flying spot scanner at the same time that the character is imaged in the appropriate size on the output CRT. A second class of machines, the so-called "digital" machines, rely on character masters which have been coded in digital form and stored on some kind of digital storage medium in the machine. With such digital machines the ability to store a large font library within the typesetter is limited only by the cost of providing a storage medium of suitable size so that it is not normally necessary for the user to repeatedly "dress" the machine by inserting new fonts. In addition, the digital machines are at least twice as fast as the fastest analog (photographic store) machines and are capable of imaging cleaner, more uniform characters than the analog machines.

Originally, when digital CRT typesetters were first introduced, the principal concern in preparing digital font masters was simply data reduction. In order to reproduce characters which were indistinguishable from characters imaged from photographic masters or printed by cast type faces, it is necessary to encode each character with a relatively fine grid; i.e., a "matrix" with a high resolution or density of raster elements. At a minimum, and for small characters, the grid may comprise 70 columns and 100 rows or 7,000 raster elements. If the presence or absence of a portion of a character in each raster element is represented by one bit, 7,000 bits of information are required to represent all elements of the grid. The U.S. Pat. No. 3,305,841 to Schwartz discloses a CRT typesetter in which the number of bits required to represent a character is compressed at least by a factor of 3 in every case, and by a factor of 5 or more in an average case. This data reduction is accomplished by identifying with a digital code the starting and ending points of the line segments (dark portions) of a character in each row or column of the grid. Thus, in a grid comprising 7,000 raster elements, the data required to define a character was reduced from 7,000 bits to approximately 1,500.

The U.S. Pat. No. 3,471,848 to Manber discloses an improvement on the above-noted system which permits an additional reduction in data. With this system, the starting and ending points of a line segment within a row or column of the grid are encoded as an incremental increase or decrease from the starting and ending points, respectively, on a line segment in the previous row or column. Data compression is achieved because the numbers required to define the incremental addresses of a line segment are smaller than the numbers required to define the absolute addresses.

The U.S. Pat. Nos. 3,305,841 and 3,471,848 also disclose a number of other techniques of data compression with digitally encoded characters:

(1) The provision of a code which indicates the number of blank rows or columns on one side or the other (or both sides) of the character.

(2) The provision of a "line repeat" code which indicates that the line segment or segments in a row or column are at the same position(s) as the segment(s) of the previous row or column.

(3) The provision of a code indicating that a selected start or end of a line segment address is to be repeated a prescribed number of times.

Notwithstanding the various techniques of data reduction, digital font masters produced in accordance with the teaching of the U.S. Pat. Nos. 3,305,841 and 3,471,848 are appreciably more expensive than the photographic masters used in the analog CRT typesetters. There are two fundamental reasons for this:

(1) The digital machines size type by varying the spacing of strokes on the output tube. There are practical limits as to how far up and down an image can be sized in this fashion. Therefore, these machines have required several different master fonts in order to cover a complete range of output sizes.

(2) Digitizing type fonts is a tedious, time consuming process. Character masters are first prepared on a standard grid and then scanned automatically to determine which raster points on the grid fall within the character. The resulting dot matrix is then "digitized" in accordance with a particular code and stored in a machine readable form.

The U.S. Pat. No. 4,029,947 to Evans et al. discloses a character encoding and decoding scheme for a CRT typesetter which makes it possible to eliminate the first disadvantage noted above. This is accomplished by encoding the normalized character outline (as distinguished from size-related character row or column line segments) with a series of successive slopes and curvatures from an initial starting point or points for the character. For this purpose, a large number of slopes and curvatures are available for selection by the encoder, with each of such slopes and curvatures being identified by its individual binary code number.

Another character representation sceme which treats characters in terms of normalized character outlines was used by the Model 1601 CRT typesetter manufactured by SEACO Computer Display in Garland, Tex. This machine, which is disclosed in the Seybold Report, Vol. 1, Nos. 12 and 13 (Feb. 14 and 28, 1972), stored the absolute coordinates of a number of points on the character outline. Data reduction was achieved because intermediate points on the outline between stored points were considered to follow straight lines between the stored points.

The SEACO 1601 CRT typesetter, as well as the typesetter disclosed in the U.S. Pat. No. 4,029,947, determine the data required for imaging the character over a range of point sizes from a single set of encoded character outline data by means of a calculation procedure, carried out either by software or hardware. In contrast, the CRT typesetters disclosed in the U.S. Pat. Nos. 3,305,841 and 3,471,848 perform a minimum of calculation because the information required to "stroke" successive line segments (i.e., the start and end addresses of each line segment) are present in the data.

Thus, while various digital character encoding schemes have been defined in the art for CRT typesetters, no scheme has been devised which optimally meets all the various requirements. These are:

(1) The encoding scheme should be conservative of space in digital memory.

(2) A single set of data defining a character should be usable to generate character images in all point sizes.

(3) The encoded data should be capable of being converted into the form required to control the CRT by a relatively simple and easy-to-automate computation procedure.

(4) The character encoding scheme should be defined by rules which are easily automated, so that the coded data may be generated from photomasters, raw dot matrices or from some other code by a digital computer.

SUMMARY OF THE INVENTION

The present invention provides a digital encoding scheme for characters or symbols, and an associated font storage system, which meets all of the above-noted requirements.

According to the invention, characters are defined by encoding their outlines on a normalized grid of first and second coordinates, as follows:

(1) A starting point on a character outline is chosen and the first and second coordinates of this point are stored.

(2) One or more straight line vectors which extend successively along the character outline from the start point, and closely approximate the outline, are chosen. Each vector is then represented by a first digital number defining the first coordinate distance, and a second digital number defining the second coordinate distance from one end of the vector to the other.

The vector outline encoding scheme according to the present invention meets the four requirements set forth above. This encoding scheme is, above all, conservative of space and memory. According to a preferred feature of the invention, the first and second digital numbers defining each vector are limited in size. For example, with a moderately high resolution such as 432 units to the "em" square, they may be 4-bit numbers so that a vector is represented by one byte (eight bits) of data. An analysis has shown that by far the majority of vectors required to define a character are within 15 units in the first and second coordinate directions on the grid. The vector encoding scheme also inherently provides incremental distances in both the first and second coordinate directions from the tip of the previous vector. These incremental distances can be defined with less information than the absolute coordinates of a vector tip. In addition, the start point and vector data are presented in a prescribed sequence which, by itself, associates the data with specific character outlines. As a result of these three factors, the present encoding scheme compares favorably with all the prior schemes of digitizing characters in the amount of data required to define a character, and in the complexity and speed of the hardware required to process this data.

Furthermore, a single set of character encoding data according to the invention is usable to generate character images in all point sizes. It is necessary only to compute the intersections between each horizontal or vertical stroke and the character outlines to determine when the CRT or laser beam should be turned on or off. The straight line vectors defined by the encoded data make it possible to carry out this computation with a minimum of hardware (or software) and at high speed.

Finally, the character encoding data according to the invention may be derived automatically from raw dot matrix information or from some other digitized code in a relatively straight-forward way using a programmed digital computer. In particular, in accordance with a preferred method of encoding, the straight line vectors are chosen by first determining successive coordinate points on each outline for which the outline deviates less than a prescribed distance from a straight line drawn between these points. Once the outline points are determined, the first and second coordinate values of each successive point are subtracted from the first and second coordinate values of the previous point to determine the coordinate increments from point to point. These increments are then stored as the 4-bit first and second digital numbers defining each vector.

In summary, the front storage system according to the present invention exhibits a combination of features which makes it uniquely suited for defining fonts of characters in digital form. Further features and advantages of this system will become apparent from the following detailed description, taken in conjunction with the various figures.

BRIEF DESCRIPTION OF THE DRAWINGS

FIGS. 9A–9D illustrate another preferred format of digital data for the character encoding scheme according to the present invention.

DESCRIPTION OF THE PREFERRED EMBODIMENTS

The preferred embodiments of the present invention will now be described in detail. The first portion of this section is directed to the font storage system, with its novel and advantageous scheme for digitally encoding characters or symbols. The second portion concerns apparatus which is capable of imaging characters defined by the font storage system.

Figure 1:
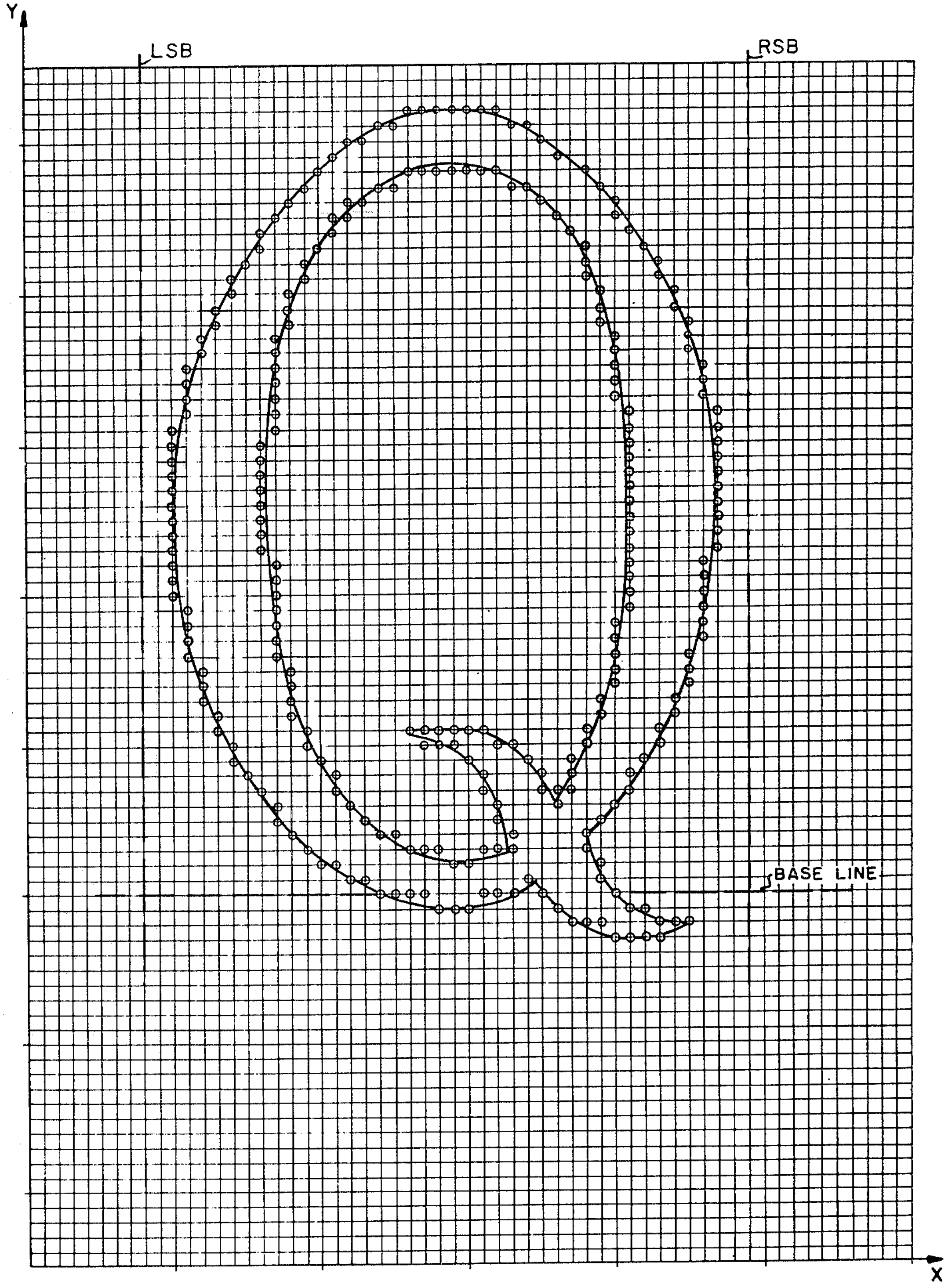
FIG. 1 is a normalized X,Y grid with the outline of an upper case "Q" superimposed thereon. The closest coordinate intersection points to the outline are also indicated.

FIG. 1 shows, by way of example, a greatly enlarged version of an upper case "Q" superimposed on a grid or matrix of horizontal and vertical lines. Each character or symbol that is recorded is located on such a grid. Horizontal and vertical resolution are indicated to be the same in FIG. 1, but this is not necessary. The characters may be of any width, and are situated on a "base line". Each character or symbol is also considered to include a "white space" about the character, and is fitted within character width edges called the left and right side bearings (LSB and RSB).

The lines in the grid shown in FIG. 1 may be represented (numbered) by the X and Y coordinates of a Cartesian coordinate set. Any point within the grid may be designated by the coordinates (X, Y) of the nearest intersection of a horizontal and vertical line. The leftmost vertical edge of the character zone is designated $X=0$ and the horizontal base line is designated $Y=0$.

When a character, such as the upper case Q shown in FIG. 1, is to be digitally encoded it must first be plotted onto the grid in such a way that all values of X and Y are represented as integers. By eliminating fractional values of the coordinates, the numbers representing X and Y may be kept small. As shown in FIG. 1, the outlines of the character "Q" are plotted by choosing the closest intersection points on the grid. Each of these points may thus be represented by its X, Y coordinates, where X and Y are integers. It is therefore possible to completely define—i.e., digitally encode—the character by listing all of these coordinates, preferably in some ordered sequence. However, since the grid or matrix must have a sufficient line density to eliminate a jagged appearance of the character, even when the character is imaged in the largest point size, a definition of the character in this manner would require an excessive amount of storage space. For example, for the upper case "Q" shown in FIG. 1 there are 267 outline coordinate points defined within a 60×80 matrix. If the matrix density is increased by a factor of 10 in each orthogonal direction (a more practical matrix for quality typesetters) the character "Q" would have about 2,500 coordinate points. Since each coordinate in a 600×800 matrix requires 20 bits of data to define (10 bits each for X and Y) one would require about 50 K bits to represent the upper case "Q". Since a typical font has more than 100 characters, a typesetter would have to have a high-speed memory with a capacity of about 60 million bits to store a single font in this type of code.

Figure 2:
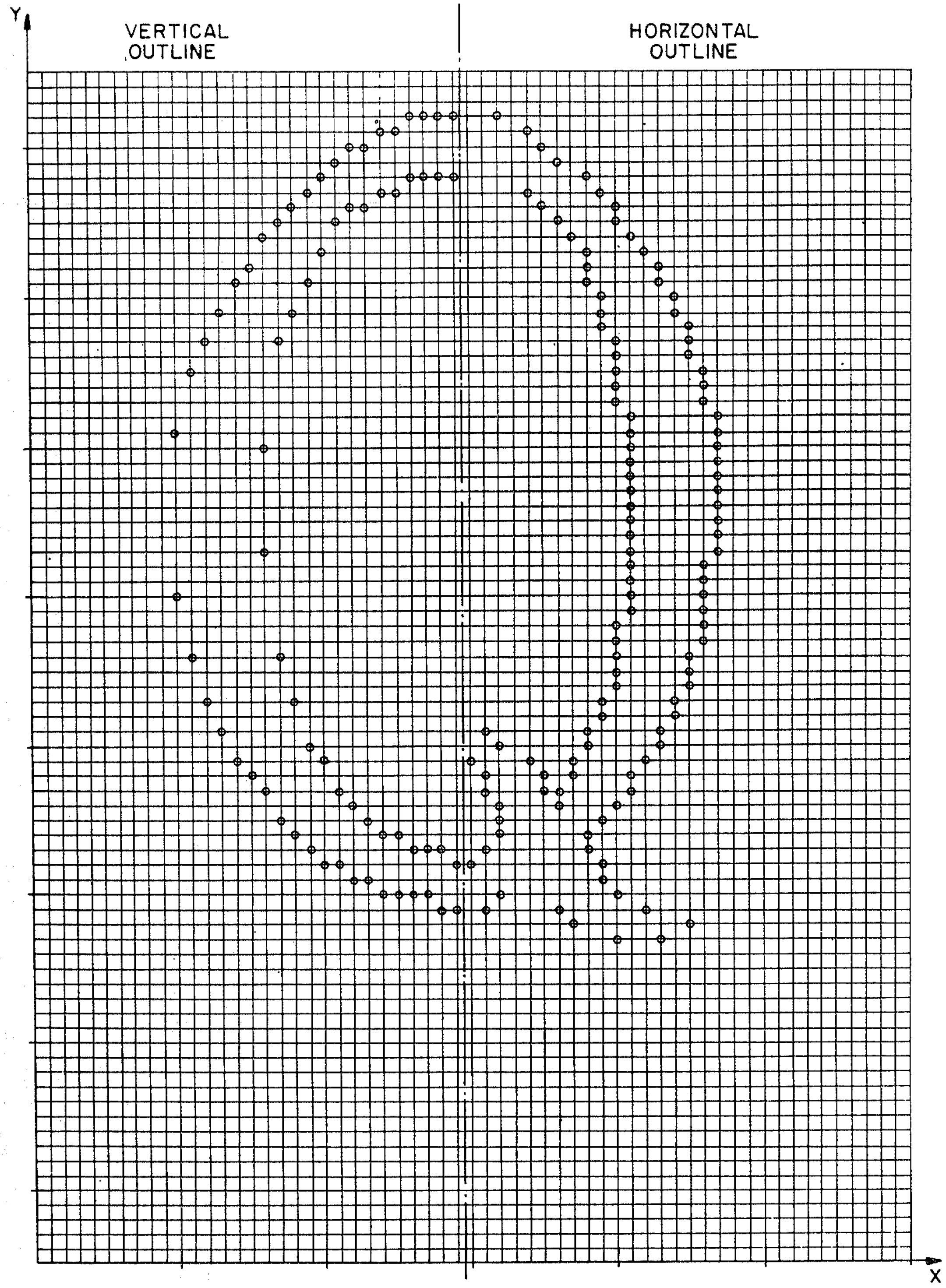
FIG. 2 is a normalized X,Y grid similar to FIG. 1 in which certain intersection points representing the character outline have been deleted.

FIG. 2 illustrates how the number of X, Y coordinate points defining a character may be reduced by designating only the first and last points in a vertical or horizontal line (coordinate). The character "Q" has been divided in half in the figure. On the left side are the terminal outline points of the vertical lines; and on the right side are the terminal outline points of the horizontal lines. By comparing FIGS. 1 and 2, it may be seen that the total number of coordinate points is substantially reduced. Wherever a vertical line of points appears in the character, as is the case along the left-hand side of the character, all the points intermediate the two end points are deleted with the vertical outline code. Similarly, wherever a horizontal line of points appears in the character, as is the case at the top of the character, the intermediate points are deleted with the horizontal outline code. Particularly if coordinate points are represented by relative distances from previous coordinate points, rather than by absolute coordinates, there is a considerable reduction in the amount of data required to define the character. Such a representation would be substantially the same as the character encoding scheme disclosed in the aforementioned U.S. Pat. No. 3,305,841 to Schwartz and the U.S. Pat. No. 3,471,848 to Manber.

The present invention provides an encoding scheme which is even more conservative of storage space than the character representation shown in FIG. 2, and which may be utilized in a typesetter, with a minimum of computational hardware, to image characters at high speed. Furthermore, this character encoding scheme may be automated in a straight-forward way using a programmed digital computer.

Figure 3:
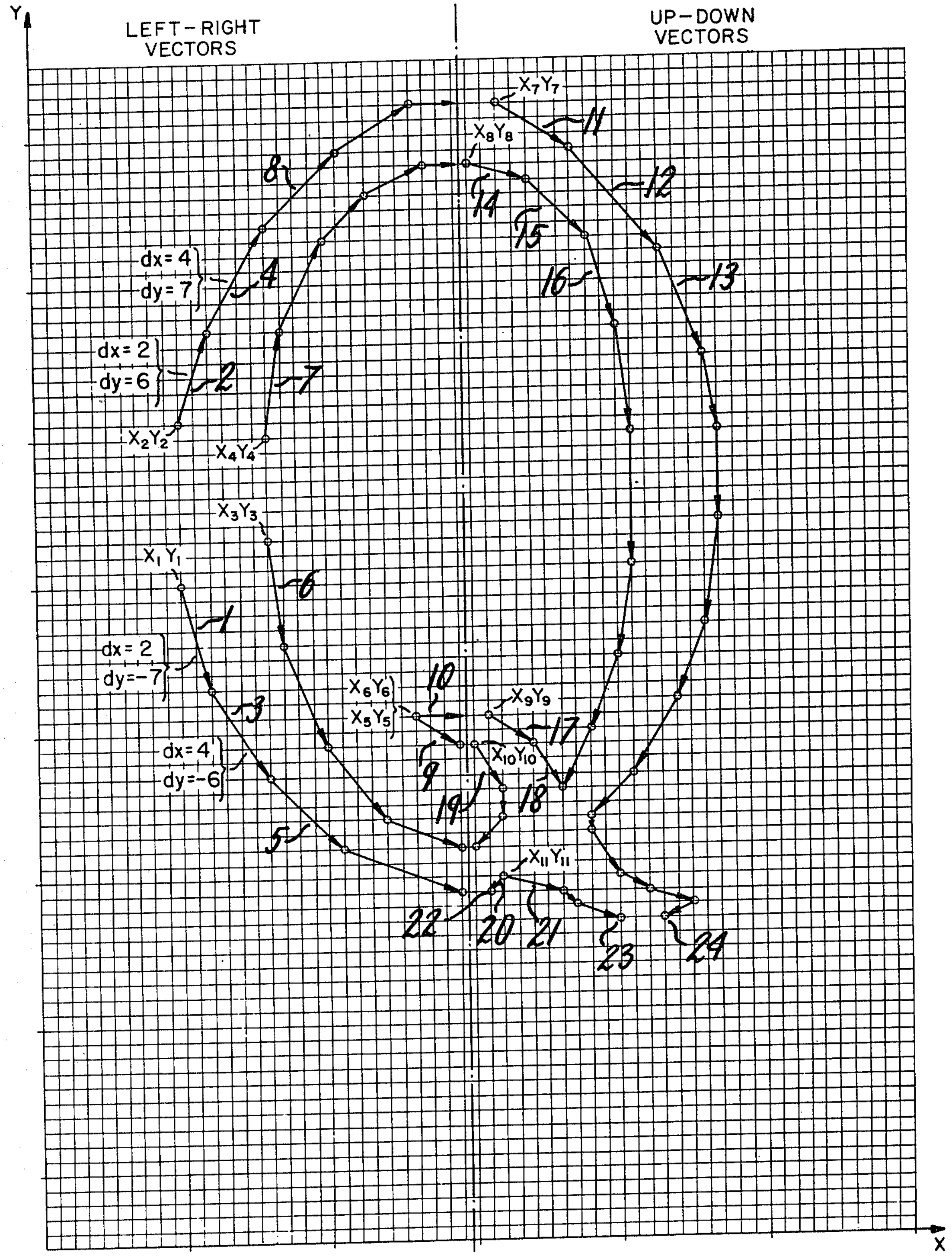
FIG. 3 is a normalized X,Y grid similar to FIGS. 1 and 2 in which additional intersection points have been deleted and straight line vectors between remaining points have been inserted in accordance with the present invention.

FIG. 3 illustrates the encoding scheme according to the present invention. According to this scheme, the number of coordinate points along the character outlines is reduced still further, and it is assumed that these points are interconnected by straight lines. Rather than specifying the absolute coordinates of these selected points around the character outline, the straight lines are represented as "vectors" by the number of coordinate units from one end of the vector to the other. The vectors are arranged in sequence, from head to tail, so that a new vector begins where a previous vector ends. A series or string of such vectors, which form an outline of the character, emanate from an initial "start point" which is given in absolute coordinates.

For instance, as is shown in the left-half of FIG. 3, vectors proceed from left to right, with the convention that if two vectors commence from the same X coordinate, the lower-most vector is listed first. Similarly, when a pair or pairs of start points are given, the lower pair and the lower start point are listed first.

Thus, in FIG. 3 the start points $X_1$, $Y_1$ and $Y_2$, $Y_2$ are first given in that order. Thereafter, the vectors emanating from these start points are listed in the order: 1, 2, 3, 4. The numbers defining these vectors are set forth in Table I:

TABLE I

| Vector Number | X Distance | Y Distance |
|---|---|---|
| 1 | 2 | −7 |
| 2 | 2 | 6 |
| 3 | 4 | −6 |
| 4 | 4 | 7 |

When the vectors 3 and 4 have run out, it is necessary to define two new start points $X_3$, $Y_3$ and $X_4$, $Y_4$ before proceeding with new vectors. Otherwise, because the character data proceeds from left to right, one would assume that there were no vectors or start points having X coordinate values in the X coordinate range of the next two vectors.

After giving the start points $X_3$, $Y_3$ and $X_4$,$Y_4$ the vectors are listed in the order 5, 6, 7, 8 using the convention bottom-to-top. Further vectors are then listed in the order left-to-right, bottom-to-top; i.e., in the order in which they "run out" as one proceeds to the right along the X axis.

Normally, start points occur in pairs; however, it is possible for two vectors to emanate from the same start point as illustrated by the vectors 9 and 10. In this case, it is convenient if the same start point be considered a "pair" of start points with identical values so that the vector 9 proceeds from the coordinate point $X_5$, $Y_5$ and the vector 10 proceeds from the point $X_6$, $Y_6$.

The right-hand side of FIG. 3 illustrates the same encoding scheme with a different convention. In this case, the vectors of a character are listed from top to bottom in an entire string following initial absolute coordinates of the upper-most point of a vector string. In the case of two start points having the same Y coordinate value, either point may be listed first.

With the outline shown in the right-hand side of FIG. 3, the order of data is as follows: The start point $X_7$,$Y_7$ and its vectors 11, 12, 13 and so on to the end of the string; the start point $X_8$, $Y_8$ and so on to the end of the string; the start point $X_9$, $Y_9$; the vectors 17 and 18; the start point $X_{10}$, $Y_{10}$; the vector 19 and so on.

Finally, as in the case of the start point $X_5$, $Y_5$ and $X_6$, $Y_6$, a single point is defined as a "pair" of start points $X_{11}$, $Y_{11}$ and $X_{12}$, $Y_{12}$. First the point $X_{11}$, $Y_{11}$ is listed with its vector 20; then the start point $X_{12}$, $Y_{12}$, is listed followed by the vector 21 and the other vectors of the string. The vector 20 terminates at the end point 22. The vector string starting with the vector 21 terminates at the end point 23. And the vector string starting with the vector 11 terminates at the end point 24.

There are two reasons why the start point and vector encoding scheme according to the present invention is more conservative of space in memory than the encoding scheme illustrated in FIG. 2 and disclosed in the aforementioned U.S. Pat. Nos. 3,305,841 and 3,471,848:

(1) Most characters, unlike the "Q" which was chosen for illustration, include a number of straight lines in their outlines.

(2) Even curved surfaces can be represented with adequate accuracy by a succession of straight line vectors of sufficient length that considerable data reduction is possible.

Experience has shown that the amount of data required to define a font of characters with the encoding scheme according to the present invention is reduced, over the scheme disclosed in the U.S. Pat. Nos. 3,305,841 and 3,471,848, by about a factor of 10.

Figure 4:
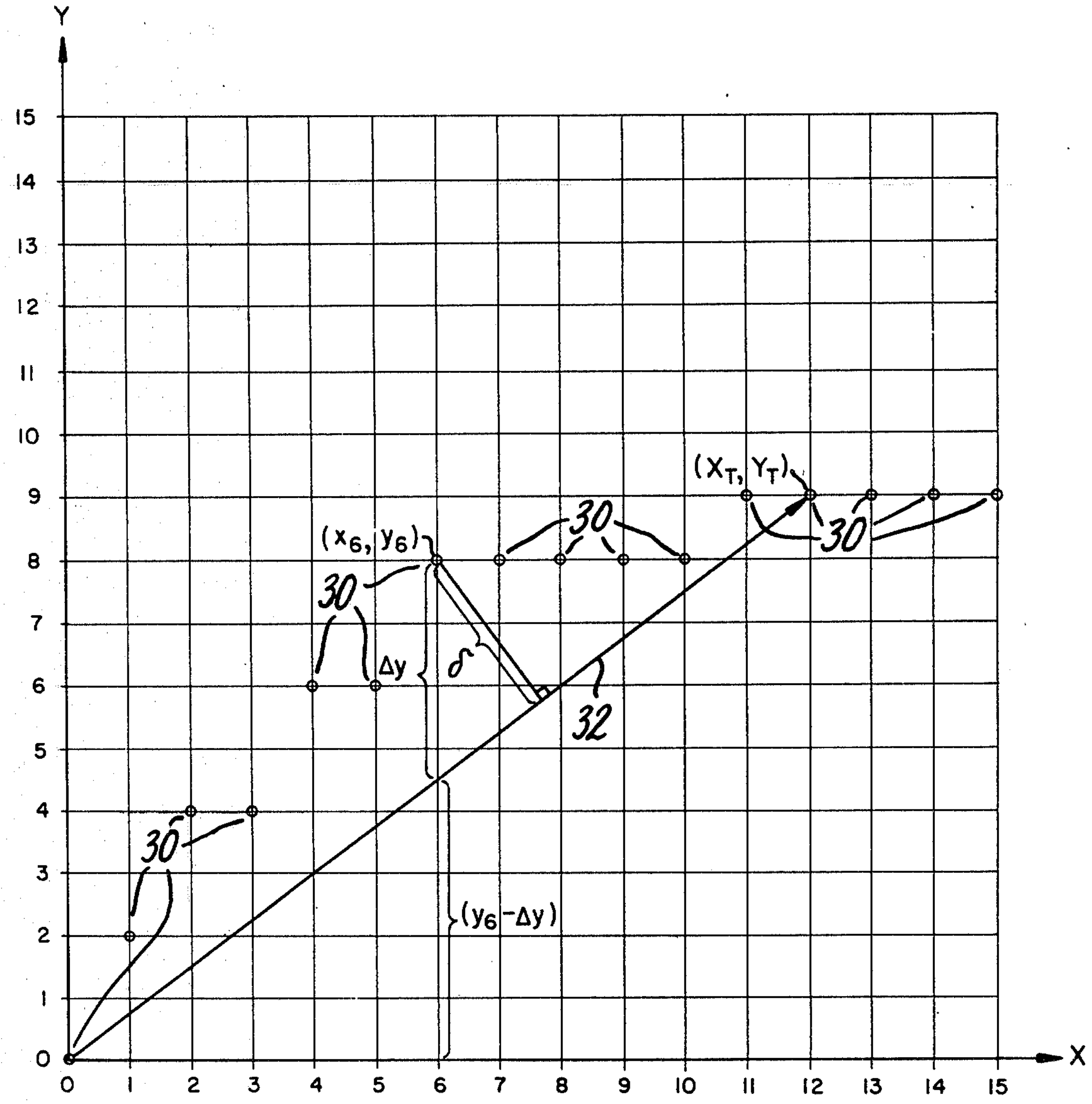
FIG. 4 is a trial matrix used in the automatic selection of vectors, in accordance with the present invention, to represent a character outline.

A further advantage of the encoding scheme according to the present invention is that it lends itself to computer automation. That is, once the digital data defining a character has been reduced to the format shown in FIG. 2, with either vertical or horizontal outlines, it may be converted into start point and vector data using a simple, straight-forward algorithm. FIG. 4 illustrates a typical calculation, and FIG. 5 such an algorithm which may be used to determine the length of a vector.

FIG. 4 shows a 15×15 trial matrix arranged in the upper right quadrant from a point (0,0) which may be an initial start point or the tip of a previous vector. The quadrant of the trial matrix assumes that a left-right vector is to be defined which extends upwardly (positive values of Y). Clearly, the trial matrix may also be positioned in one of the other quadrants depending upon the direction in which the vector extends.

Also, the size of the trial matrix corresponds to the maximum permissible length of a vector (in this case 15 units each in the X and Y directions, respectively). If the vectors are chosen to have a greater or lesser maximum length, the size of the matrix is adjusted accordingly.

In this example, the points 30 represent the actual digitized outline of the character in the format shown in FIG. 2. The line 32 is a proposed vector which must be tested to determine whether it comes sufficiently close to the most distant outline point to represent the outline. The coordinates X,Y define the current trial point for the tip of the vector 32. The coordinates of all of the outline points 30 are designated $x_0, y_0; x_1, y_1; \ldots x_{15}, y_{15}$, in accordance with their sequence along the X axis of the matrix.

Figure 5:
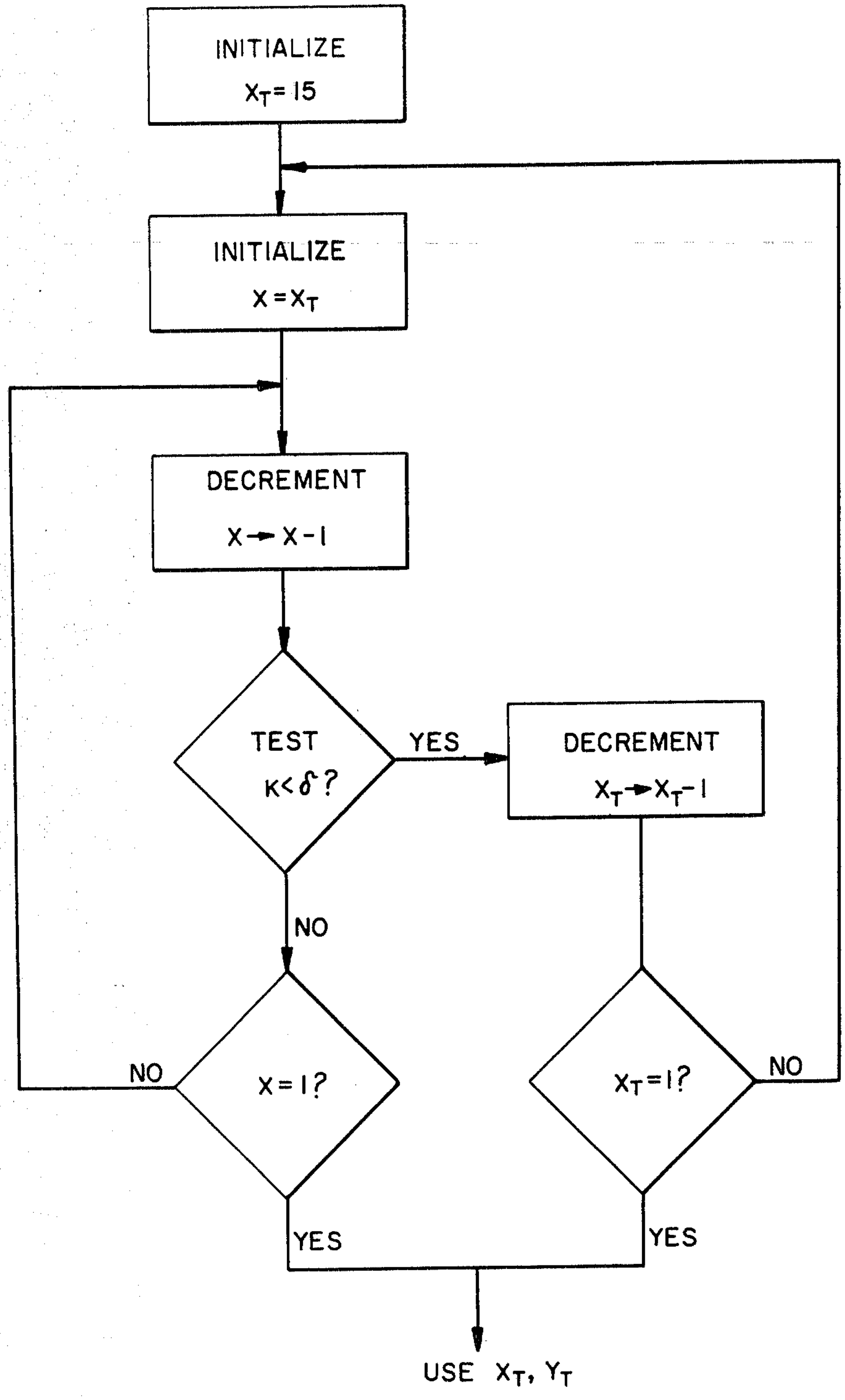
FIG. 5 is a flow chart indicating the steps which are taken in the automatic selection of vectors to represent a character outline.

As is shown in FIG. 5, the first outline point to be tested is the point on the matrix with the largest forward (in this case X) component from the point (0,0). In FIG. 4, the first trial point $X_T$, $Y_T$ is (15,9). The fourth trial point, where $X_T$, $Y_T$ are coordinates (12,9) as shown in FIG. 4, is tested after fit failure on the three prior trial points: (15,9), (14,9), and (13,9). The purpose of the algorithm is to find the longest vector that passes the fit test. The algorithm tests each lower valued outline point 30 (with coordinates x,y) to determine whether a perpendicular distance δ from that point to the vector drawn from the initial point (0,0) to $X_T,Y_T$ exceeds a preset fit constant K. Initially, the coordinates x,y of the point 30 just prior to the trial point $X_T,Y_T$ are chosen and the test is performed. If the distance δ is less than the constant K (the test is passed) the outline point 30 with the next lowest value of X is chosen and the test is repeated. If the distance δ exceeds the constant K (the test failed) the test point $X_T,Y_T$ is abandoned and the next lowest value of $X_T$ is chosen.

When a trial point is found for which all the outline points 30 with lower X coordinates pass the test, or when the X coordinate $X_T$ of the trial point has been reduced to one, the coordinates $X_T,Y_T$ are used in defining the vector. The vector is then represented by the difference between the coordinates of the last previous vector tip (coordinate (0,0) in the trial matrix) and the coordinates of the chosen trial point $X_T,Y_T$. That is, dx, dy is set equal to $X_T,Y_T$.

The perpendicular test distance δ is determined for each point by simple geometry. Using similar triangles, we have:

$$\frac{\partial}{\Delta y} = \frac{X_T}{\sqrt{X_T^2 + Y_T^2}}, \text{ and}$$

$$\Delta y = y_6 - x_6 \frac{Y_T}{X_T}.$$

Solving for δ:

$$\partial = \frac{X_T}{\sqrt{X_T^2 + Y_T^2}} \left(y_6 - x_6 \frac{Y_T}{X_T}\right)$$

$$\partial = [\text{TABLE I value } \theta\ X_T, Y_T] \cdot [y_6 - x_6 (\text{TABLE II value } \theta\ X_T\ Y_T)]$$

The values of $$\frac{X_T}{\sqrt{X_T^2 + Y_T^2}} \text{ and } \frac{Y_T}{X_T}$$

may, of course, be calculated each time by a computer. However, since there are a limited number of $X_T,Y_T$ points in a 15×15 matrix, it is more convenient if all the possible solutions for these expressions be entered in a TABLE I and a TABLE II, respectively, so that they may be quickly looked up and retrieved from storage.

In addition, it should be noted that the preset fit constant may be chosen arbitrarily small so that the vectors come as close as desired to the actual character outline. In a preferred embodiment the constant K is made dependent upon the slope of the trial vector so that near horizontal slopes may deviate more from the outline.

If $Y_T/X_T > 1$, $K = 0.5$; and if $Y_T/X_T \leqq 1$, $K = 1.0$.

It will be appreciated that the algorithm shown in FIG. 5 is extremely simple and may be carried out using a general purpose computer in which the vertical outline or horizontal outline points (per FIG. 2, left side and right side, respectively) are stored. A program for a particular computer may be developed from this algorithm using well-known programming principals and techniques.

FIG. 4 shows a trial matrix in which the maximum permissible values of X and Y are 15 units. A vector terminating anywhere within this matrix may be defined by two 4-bit binary numbers: dx and dy. An analysis has shown that, even with a grid of moderately high resolution, by far the majority of vectors required to define a character fall within such a 15×15 matrix so that it is convenient, and results in data compression, if 8 bits (one byte) of data are used to define each vector.

According to the invention, therefore, the number of bits defining a vector is chosen to minimize the total data content in a font of characters for a given resolution. The process of choosing the maximum vector length involves the following steps:

(1) The maximum point size of the characters to be generated by the typesetter is first determined.

(2) Given the maximum point size, a resolution is chosen which permits reproduction of the fine features in the largest characters.

(3) Given the resolution, the preset fit constant K is chosen so that the vectors follow the curved character outlines with sufficient accuracy that, when characters are reproduced in the largest point size, they will not appear to have a succession of "flats" on curved surfaces.

(4) Once the resolution and constant K are determined, it is possible to generate a statistical distribution of vectors of varying lengths for all characters in a font. Such a vector length distribution will show the relative numbers of vectors at each of the permissible lengths (1×1, 3×3, 7×7, 15×15, 31×31, etc.)

(5) From this vector length distribution, a maximum vector length is chosen which minimizes the total quantity of data. If the maximum vector length is too short (e.g., 3×3 which can be defined with a total of 4 bits) the the definition of a character will require an excessive number of vectors and the data reduction will be minimal. Similarly, if the maximum vector length is too long (e.g., 255×255 which can be defined by 16 bits) the amount of data required to define short vectors is unnecessarily large, resulting in minimal data reduction.

Figures 6A, 6B, 6C, 6D, 6E:
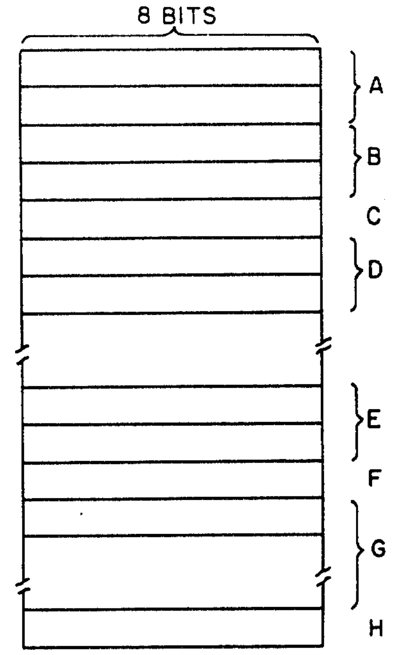
FIGS. 6A–6E illustrate one preferred format of digital data for the character encoding scheme according to the present invention.

FIG. 6 illustrates a preferred format for defining a character with left-right vectors (FIG. 3, left side). These vectors are specified in one quadrant by the X,Y coordinates of the end of the vector relative to the quadrant origin. Since outlines are traced from left to right across the character, only the two right-hand quadrants are used. Control codes permit quadrant selection and curve initialisation and completion. Start points are defined by their Y values only, because the X position is implied by the coding.

A "block" of data defining the character starts with a "header word" A (comprising two 8-bit bytes) which gives the X coordinate of the character left side bearing. This is followed by a "start point word" B giving the Y coordinate of the lowest start point in the first X grid line of the character. The word B is followed by a "vector byte" giving the values dx and dy of a vector from that start point, and then another start point word D defining the next lowest point. Still another start point word E defines the highest point in the first X grid line and a vector byte F defines a vector from this start point. If there are any start points within fifteen X units from the first grid line, these may be interspersed in their proper Y value sequence. The character data block continues with vector bytes, "control bytes" and start words C and terminates in an "end block byte" II denoting the end of the block.

FIGS. 6B, 6C, 6D and 6E show the formats for the header word, start point word, vector byte and control byte, respectively. These formats are drawn with the least significant bit on the right. The significance of the symbols within these words and bytes are as follows:

| | |
|---|---|
| Header Words: | |
| $X_8X_7X_6X_5X_4X_3X_2X_1X_0$ | Left side bearing magnitude. |
| T | Test bit, may be used for detecting errors. |
| C | Chain bit indicates whether this word heads the final character block. |
| K | Kern bit, determines the direction of the left side bearing (away from or towards the previous character). |
| $N_3N_2N_1N_0$ | The number of start words on the first grid line of the character. |
| Start Point Words: | |
| $Y_9Y_8Y_7Y_6Y_5Y_4Y_3Y_2Y_1Y_0$ | The vertical distance between the character base line and the start point (either positive or negative) |
| S | Undefined. |

-continued

| | |
|---|---|
| D | Down bit, determines in which of the two right-hand quadrants subsequent vector displacement will occur. |
| $X_3X_2X_1X_0$ | The number of gird lines between the appearance of the "start new line" control code and the actual start points themselves. |
| Vector Byte: | |
| $Y_3Y_2Y_1Y_0$ | This value defines the vertical offset between the beginning and the end of a vector. |
| $X_3X_2X_1X_0$ | This is the horizontal offset between the beginning and the end of a vector. |
| Control Byte: | |
| 0 0 0 0 | These bits, if set to zero, define a control byte. |
| $M_3M_2M_1M_0$ | These four bits form a binary number (0 to 15) which designates a "control function". |

Control functions:

Control functions are required throughout the character block and are specified in the control byte with its four significant bits set to zero. This permits sixteen different functions to be defined by the numerical value of the remaining four bits.

| | |
|---|---|
| 0 | Filler. |
| 1 and 2 | Undefined. |
| 3 | Start two outlines with no intermediate outlines. |
| 4 | Start two outlines below existing ones. |
| 5 | Start four outlines with no intermediate outlines |
| 6 | Start four outlines below existing ones. |
| 7 | Replace an existing outline value with a new without changing the numerical order of values up the grid line (i.e., end one and start one outline). |
| 8 | Undefined. |
| 9 | End block. |
| 10 and 11 | Undefined. |
| 12 | End two outlines. |
| 13 | End four outlines. |
| 14 | Change direction. Subsequent vectors occur in other quadrant. |
| 15 | Displacement by 16 units in a vertical direction with no horizontal movement. |

Figure 7:
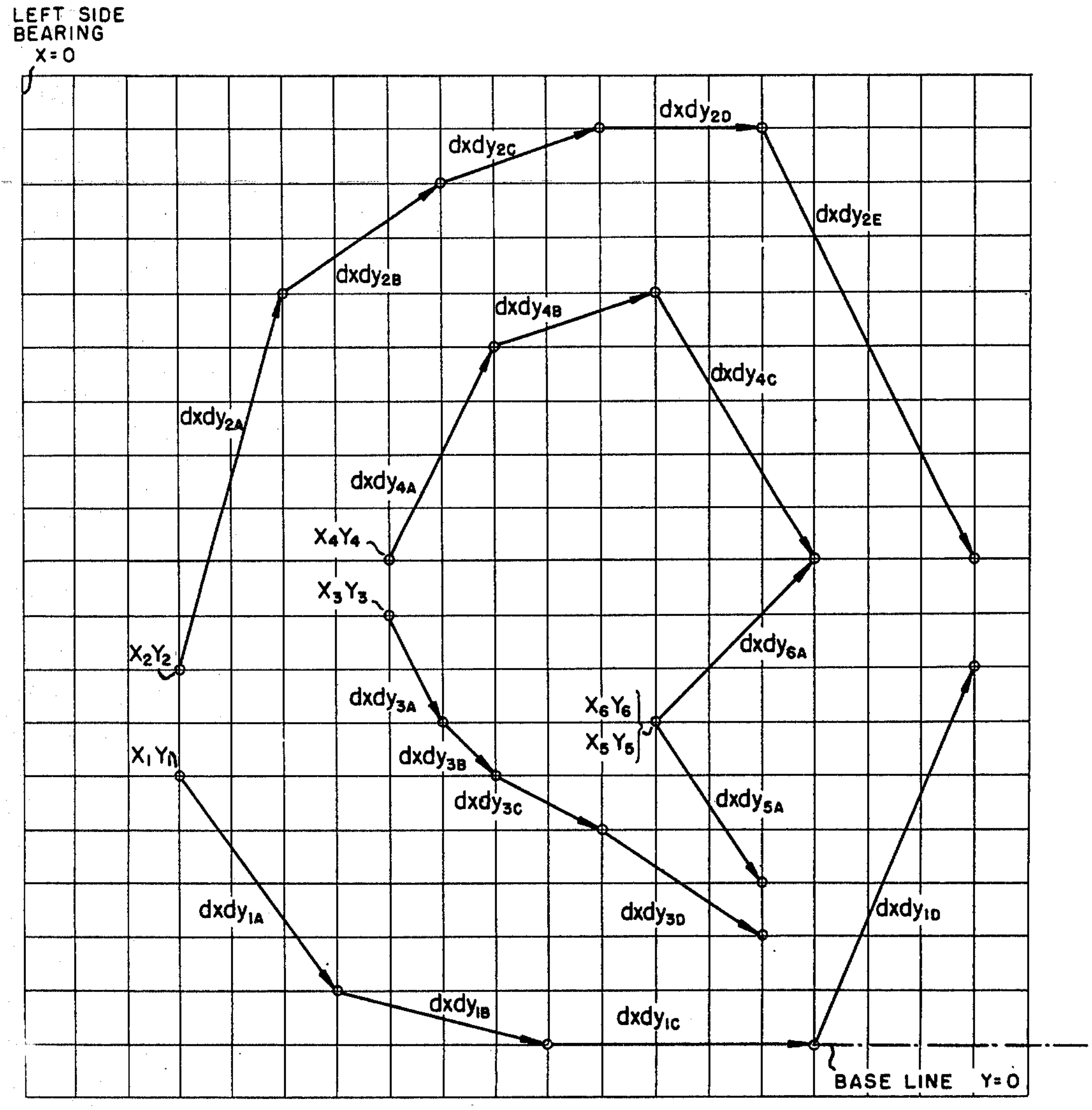
FIG. 7 is a normalized X,Y grid with the outlines of a representative "character" defined by start points and vectors following the arrangement shown in the left-hand side of FIG. 3.
Figure 8:
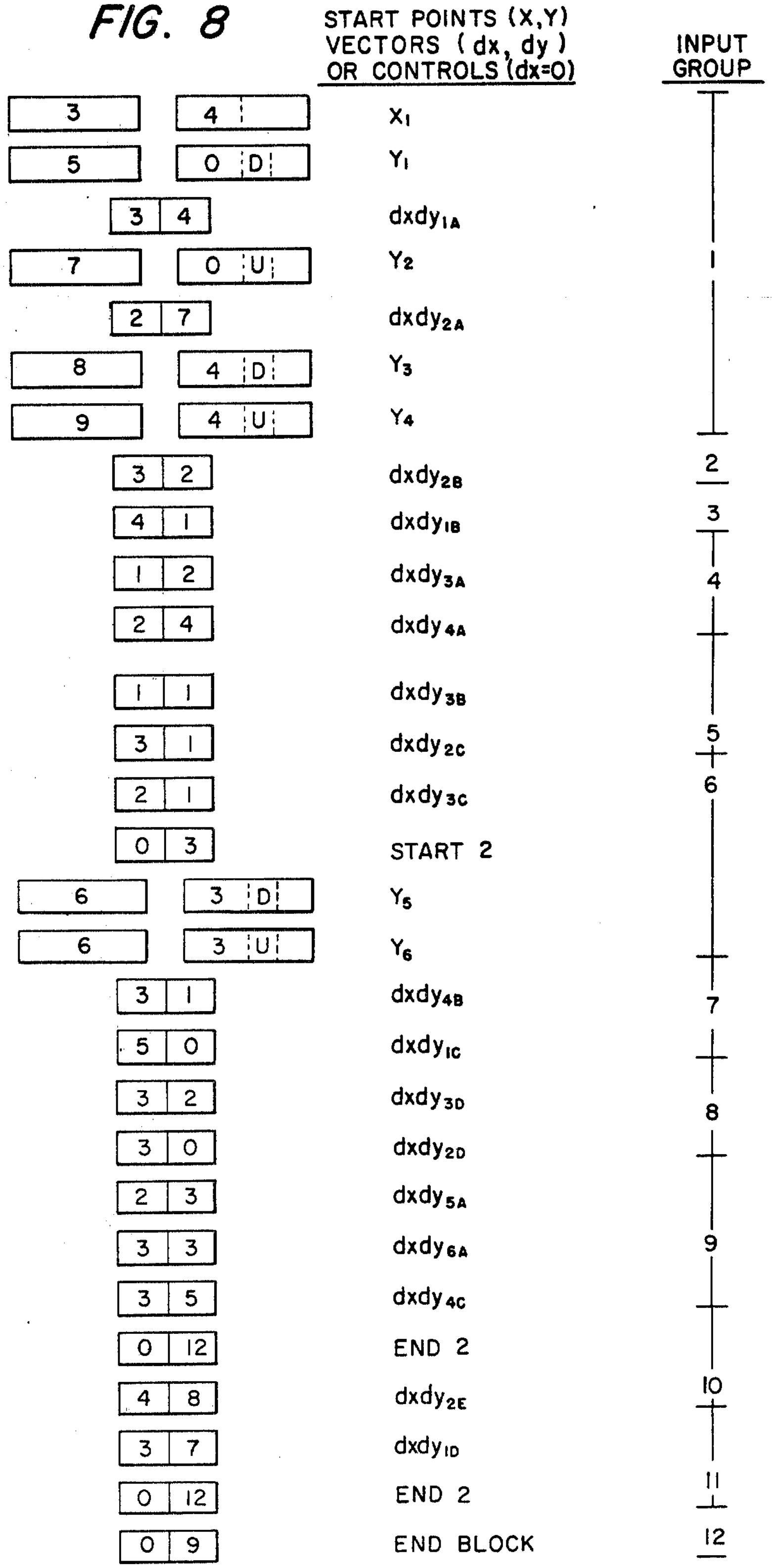
FIG. 8 shows the actual coding for the character represented in FIG. 7 using the data format illustrated in FIG. 6.

FIGS. 7 and 8 illustrate how a character may be encoded with the encoding scheme according to the present invention using the format illustrated in FIG. 6. In FIG. 7 a simple "character" has been drawn which contains a number of start points, end points and intervening vectors. The actual coding for this character is shown in FIG. 8, left column. The center column in FIG. 8 explains this coding and the right column shows the sequence in which the data would be brought in and used by the typesetter.

FIG. 9 illustrates a preferred format for defining a character with up-down vectors (FIG. 3, right side). These vectors are specified in one quadrant by the X,Y coordinates of the end of the vector relative to the quadrant origin. Since outlines are traced from top to bottom down the character, only the two lower quadrants are used. As in the format illustrated in FIG. 6, control codes permit quadrant selection and curve initialization and completion. With this format the grid line Y=0 is at the top of the character area and successive horizontal grid lines are given consecutive Y numbers down the grid.

A block of data defining the character starts with a "Y data word" which gives the highest Y start coordinate of the character. This is followed by an "X data word" defining the X start coordinate of an outline, and the vectors and controls for this outline.

All subsequent outlines are sequenced such that the starting point Y values are in increasing order; i.e., the Y value for each next outline is equal to or greater than the Y value for the preceding outline. Thus, entire strings or sequences of vectors are defined and completed before defining the next string. If two starting points have the same Y value, either point may be listed first with its entire vector string.

FIGS. 9B, 9C and 9D show the formats for the Y data word, X data word and the vector or control word, respectively. These formats are drawn with the least significant bit on the right. The significance of the symbols within these words and bytes are as follows:

| | | |
|---|---|---|
| Y Data Word: | | |
| | Y | This data defines the vertical position of the start point. |
| | K | Undefined. |
| X Data Word: | | |
| | XN | This data defined the horizontal position of a start point. Left side bearing (LSB) is defined as 0. |
| | ± | The sign bit defines the displacement of XN with respect to the LSB. |
| | L | The L Bit defines the direction of the dx of the first vector. |
| | F | The F Bit or "Flare Bit" defined which vector slope will be used by the decoder in extrapolating a character outline in the region of the grid immediately above the line YN. |
| | E | The E Bit or "Extrapolation Bit" defines whether extrapolation is or is not used in the region above the grid line YN. |
| | B | The B Bit is the "Boundary On/Off Bit" and defines whether the outline is the left-side (on) boundary or the right-side (off) boundary. |
| Vector/ Control Word: | | |
| | dydx | For all values of dy greater than 0, this byte defines the slope of the vector outline of the character from the start point (YN,XN) or from the last vector end point. |

All vectors are sequenced serially in the same sequence that they occur on the character outline. The initial vector is located in the MSB's of the word, the second in the LSB's.

Control Functions:

For all values of dy=0, this byte defines a control code. The specific control is dependent upon the value of dx as indicated below:

| | |
|---|---|
| 0 | End of outline. If located in MSB's, LSB's must be filled with zero's. |
| 1 | Reverse the dx direction for the next vector. |
| 2 | Defines that there are no displacement vectors applicable to the start point defined by the preceding Y and X Data Words. This control will always be located in MSB's, the LSB's being filled with zeros to produce an "End of Outline" control code. |
| 3 | Defines a vector with a horizontal displacement of 0 units (a vertical vector) and a vertical displacement greater than 30 units. The next data byte defines a binary value of the vertical displacement. The data byte has a resultant range of vertical displacement of 0 to 255 inclusive, but it shall not be utilized between 0 and 30 inclusive. |
| 4 | Defines a vector with a horizontal displacement of 1 unit and a vertical displacement of 30 units. |
| 5 | Defines a vector with a hozizontal displacement of 1 unit and a vertical displacement of 60 units. |
| 6 | Defines a vector with a horizontal displacement of 1 unit and a vertical displacement of 120 units. |
| 7 | Defines a series of vectors which follow a concave outline. |
| 8 | Ditto the function 7 for a convex outline. |
| 9 | Ditto the function 7 for a straight outline. |
| 10 | Defines whether the outline has a low or a high degree of concavity or convexity (this bit is sensed only if bits 7 or 8 indicate concavity or convexity). |
| 11 | Defines a vector with a vertical displacement of 1 unit and a horizontal displacement greater than 255 units. The next data byte defines the binary value of horizontal displacement in excess of 255 units. |
| 12-14 | Undefined. |
| 15 | Defines a vector with a horizontal displacement of 1 unit and a horizontal displacement greater than 18 units. The net data byte defines the binary value of the horizontal displacement. |

Figure 10:
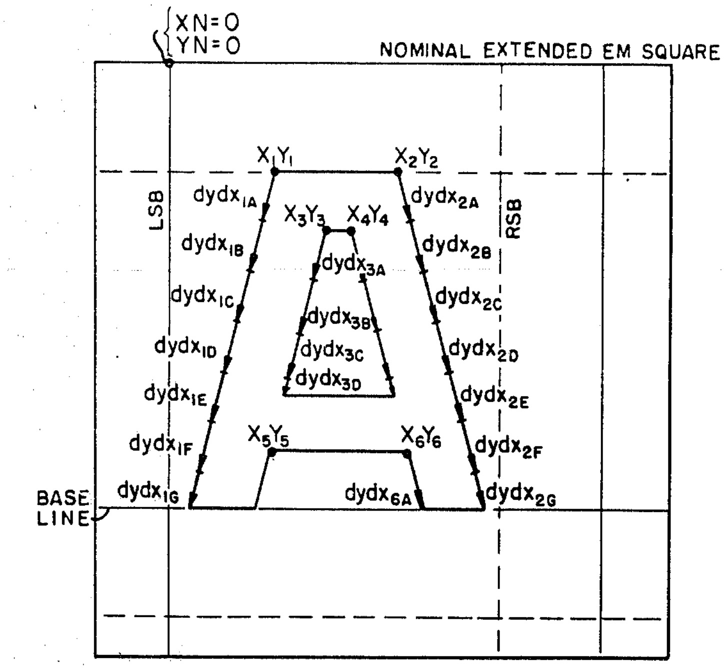
FIG. 10 illustrates a representative character superimposed on a normalized X-Y grid with the character outlines defined by start points and vectors following the arrangement shown in the right-hand side of FIG. 3.
Figure 11:
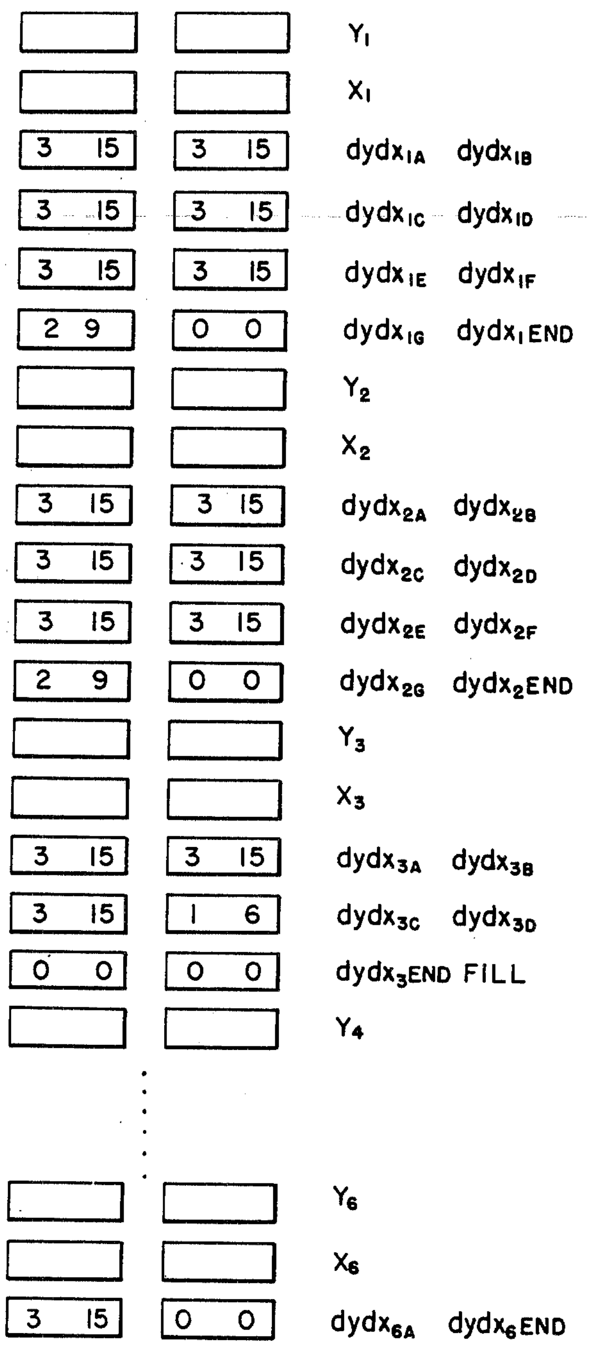
FIG. 11 shows the actual coding for the character represented in FIG. 10 using the data format illustrated in FIG. 9.

FIGS. 10 and 11 illustrate how a character may be encoded with the encoding scheme according to the present invention using the format illustrated in FIG. 9. In FIG. 10 the character "A" contains a number of start points, end points and the intervening vectors. The actual coding for this character is shown in FIG. 11, left column. The right column in FIG. 11 explains the nature of this coding.

Figure 12:
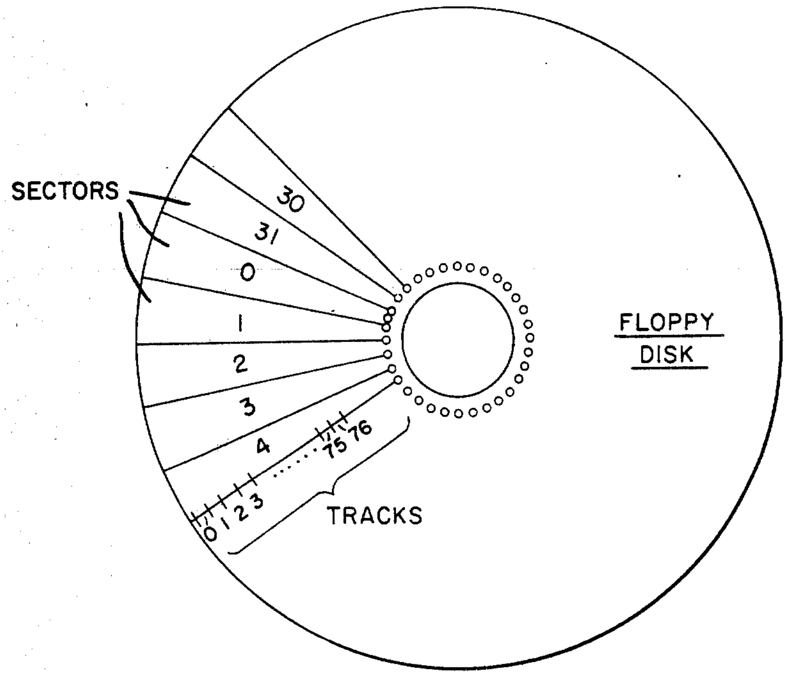
FIG. 12 is a plan view of a hard-sectored floppy disk with sectors and tracks indicated.

FIG. 12 illustrates a conventional magnetic disk, called a "floppy disk", which has been removed from its cardboard jacket. The disk is about 8 inches in diameter and has a 1½ inch center opening to permit rotation on a spindle. The disk may be magnetically sensitive on one or both sides so that the binary information may be recorded and stored on, and retrieved from one side or both sides.

The floppy disk shown in FIG. 12 is "hard sectored" by 32 small holes spaced evenly around the center opening. A 33rd hole is arranged midway betwen two of the evenly placed holes to indicate a start point. The holes, which may be sensed by a photocell, divide the disk into 32 equal sectors (indicated by lines in FIG. 12 for purposes of illustration only). The disk is also divided concentrically into 77 circular tracks (also indicated by lines for purposes of illustration only). Thus, a location on the disk may be specified by track and sector, the numbers of a track and sector constituting an "address". Each address (track and sector) on the disk is capable of storing up to 250 bytes of information.

Figure 13:
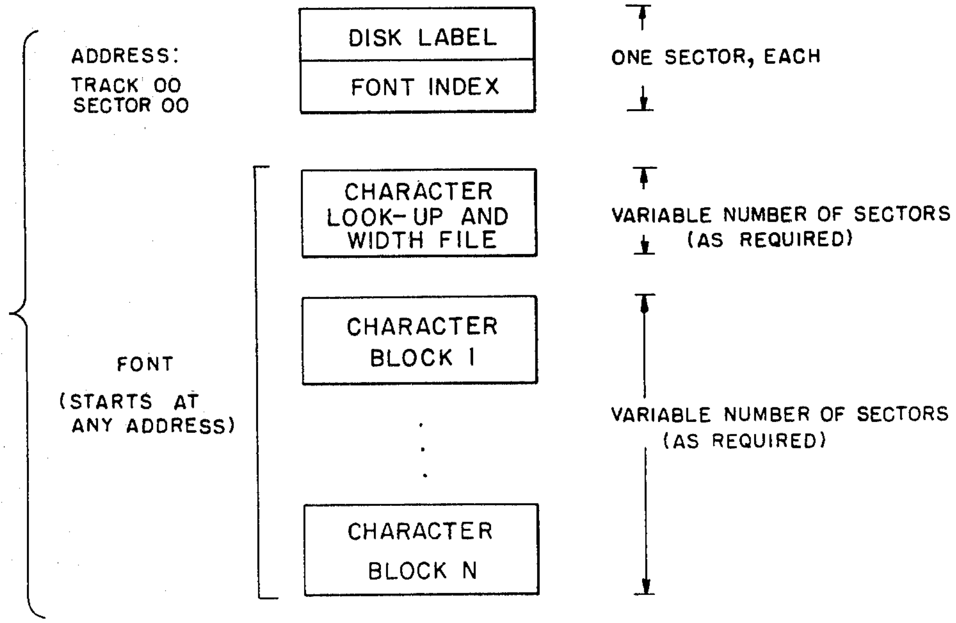
FIG. 13 is a chart illustrating how the font and character data are arranged (recorded) on a floppy disk.

FIG. 13 shows how one or more fonts of characters, which are encoded in accordance with the principles of the present invention, may be recorded on a floppy disk. Two specific sectors on the disk on a specific track (e.g., on track 00, sectors 00 and 01) are allocated to disk label and font index. The encoded character information may be stored, commencing at any other address on the disk.

The disk label describes the contents of the disk in conventional Arabic letters, encoded in binary with a standard code such as the American Standard Code for Information Interchange (ASCII). The font index gives the initial address of each font recorded on the floppy disk. This font index may consist, for example, of a sequence of double words, the first word defining the font number, and the second word the track and sector address of the start of the font. Thus, if a user wishes to locate font number 126, he causes word defining the font number, and the second word the track and sector address of the start of the font. Thus, if a user wishes to locate font number 126, he causes the computer to scan the font index to find the initial address of that font.

The font information consists of a character lookup and width file, followed by blocks of data defining as many characters as there are in the font. The character data blocks may have the format shown in FIG. 6A or FIG. 9A or they may have some other suitable format for the encoded character data.

Figure 14:
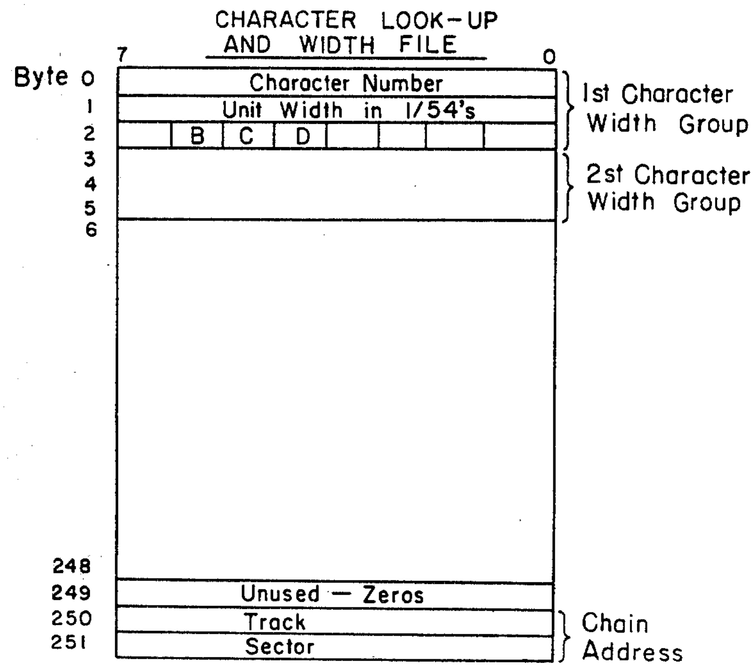
FIG. 14 is a chart detailing the character look-up and width file shown in FIG. 13.

A typical look-up and width file is shown in FIG. 14. This file contains data applicable to individual characters which are needed by a composition system. The character imaging system or typesetter makes no use of this information.

If three bytes are used to define the data for each character, up to 83 characters may be described in one sector. Each character width group of three bytes includes a character number, the character unit width and "flag bits", respectively. The character number is related to the form of the character by keyboard layout number. The unit width is the width of the character in 1/54ths of an "em".

The flag bits are designated bits defining specific characteristics of the character. The flag bit 6 is the "B" bit denoting that the character is a base piece accent aligned with the lower portion of character which is not to be jumped when the upper case mode is envoked. Flag bit 5 is the "C" bit denoting that the character is a center-aligned piece accent, and flag bit 4 is the "D" bit denoting that the character is a drawn display superior figure.

The character look-up and width file concludes with a chain address containing the address of the next character width file sector or the first sector of the encoded character data.

Figure 15:
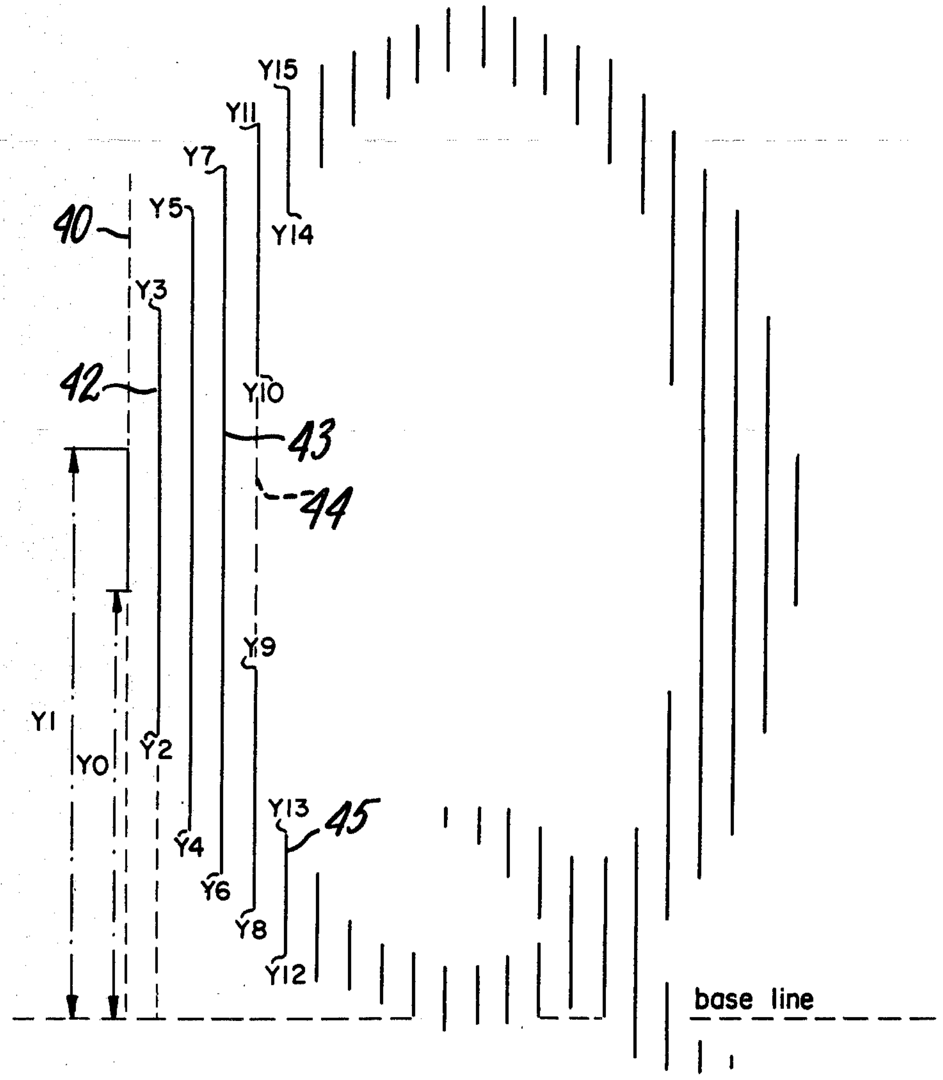
FIG. 15 shows an upper case "Q" as generated by vertical "strokes" on the face of a CRT.

Once digitized character information is encoded and stored on a floppy disk, it must be read, interpreted and imaged by a typesetter onto photographic film. This character generation process will now be described for the character encoding scheme set forth above in connection with FIGS. 3–14 as arranged in the particular format shown in FIGS. 6–8. FIG. 15 illustrates the type of data required by a character generator to "stroke" a character (in this case again the "Q") by means of a CRT, laser beam or some other flying spot scanner. In particular, the character generator requires data in the form of intercept values on each output scan line. In the case of vertical scan lines, as shown in FIG. 15, these are the signed Y valves of the on/off points on each scan line. The values are referenced to the character base line with the positive values of Y above, and negative values below the base line. The top-most value of the highest imaged segment in a scan line is flagged so that the character generator can immediately proceed to scan the next line.

In FIG. 15, in the first (left-most) scan line 40 the scanning beam is moved vertically upward and proceeds at a constant rate from the base line. The beam remains off until it moves a distance Y0 from the base line. At this point, the beam is switched on and remains on until it moves a distance Y1 from the base line. Thereafter, the scan may continue, with the beam switched off, until it reaches the top of the raster matrix. Preferably, however, the beam will immediately retrace to below Y2 or to the base line and proceed with the second scan line 42. This retrace is triggered by associating and "end-of-the-line" flag with the data Y1.

The data sequence required by the character generator is therefore, Y0, Y1, Y2, Y3, Y4, Y5, Y6, Y7, Y8, Y9, Y10, Y11, Y12, Y13, Y14, Y15, etc., the end-of-the-line flag being indicated in this sequence by the italics. Since the data is stored and supplied to the typesetter in start point and vector outline format, the typesetter requires a "code converter" to convert this vector format into the intercept format illustrated in FIG. 15. The structural details of the code converter will depend upon the particular vector format used (for example, the format illustrated in FIGS. 6–8, or the format illustrated in FIGS. 9–11) and the particular intercept format (vertical or horizontal scan; single character or multiple characters per scan line). In the embodiment described below, the code converter is capable of translating the format illustrated in FIGS. 6–8 into a vertically scanned, single character intercept format.

In executing the translation from vector format into intercept format, the code converter should preferably be capable of performing scaling, interpolation, and averaging. These three operations are illustrated in FIGS. 16–19.

Figure 16A:
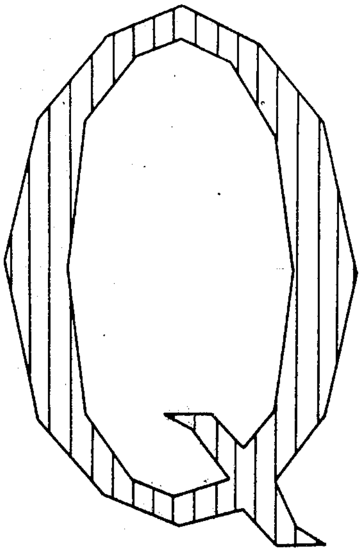
FIG. 16A shows a typical character having its outline bounded by straight line vectors which intercept vertical scan lines.
Figure 16B:
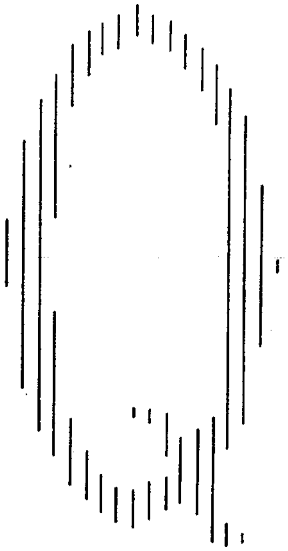
FIG. 16B illustrates how the character of FIG. 16A is imaged in a particular character width by the vertical scan lines.
Figure 17A:
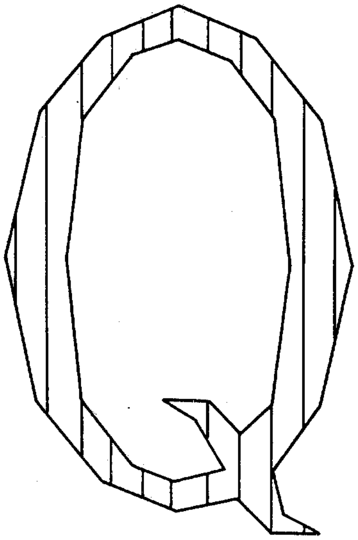
FIG. 17A shows a typical character having its outline bounded by straight line vectors which intercept vertical scan lines.
Figure 17B:
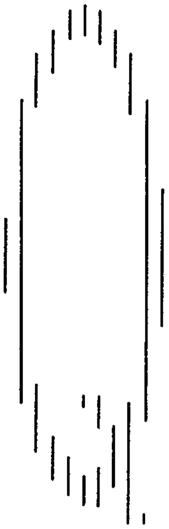
FIG. 17B illustrates how the character of FIG. 17A is imaged in a particular character width by the vertical scan lines.

Assuming that the output resolution (scan line density) of the character generator is fixed, characters must be horizontally scaled by adjusting the number of scan lines required to define a character. FIGS. 16 and 17 illustrate this principle, whereby the width of the character is varied by evenly distributing the necessary number of scan lines across the character.

Vertical scaling may be accomplished either by analog hardward (e.g., a vertical deflection amplifier) or by digital hardware or software (e.g., by multiplying the intercept values Y0, Y1, Y2 . . . etc. by a digital scale factor).

Figure 18:
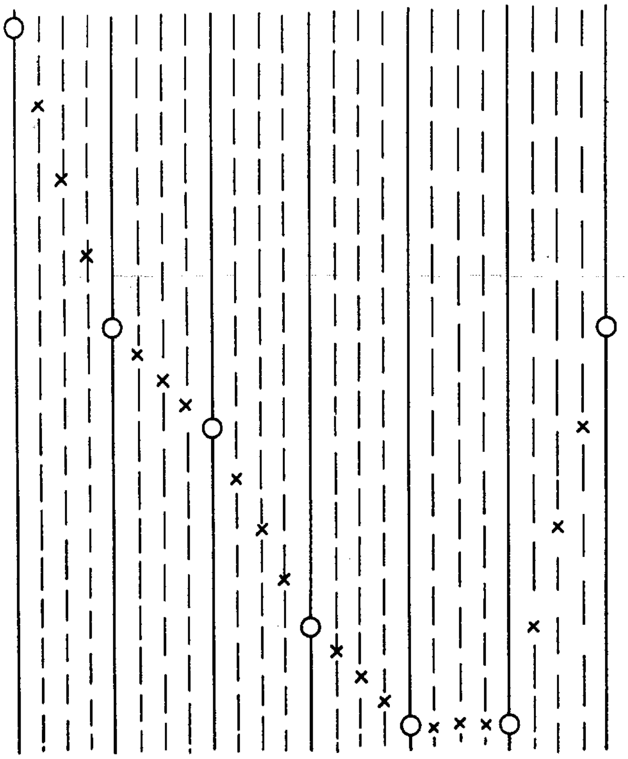
FIG. 18 illustrates how stroke end points (interrupt values) are determined by interpolation from encoded character data.

For characters of larger point size it may be necessary to interpolate to find the beam switch point on certain scan lines because the line density of the matrix or grid on which the character is encoded is insufficient. In accordance with the preferred embodiment of the invention, straight line interpolation is used to increase the digitized resolution. For example, if the encoded character data corresponds to a 32 point character in the resolution of the character generator, it is necessary to muptiply by more than two to achieve 72 point output. The vertical Y values are simply doubled and the character generator multiplier makes the further adjustment. The code converter inserts three additional equally spaced vertical lines between each pair of digitization lines and uses a straight line interpolation to estimate intercept values as shown in FIG. 18. In this figure, the continuous lines are the original digitization resolution and the dashed lines are the additional interpolated positions. A "0" indicates a digitization point derived from vector decoding and an "X" indicates an interpolated point. If all of the additional lines were output at the constant output resolution, the character would appear four times the original size (e.g., 128 vs 32). It is therefore possible to periodically omit lines across the character to produce any width of character less than this size.

Figure 19:
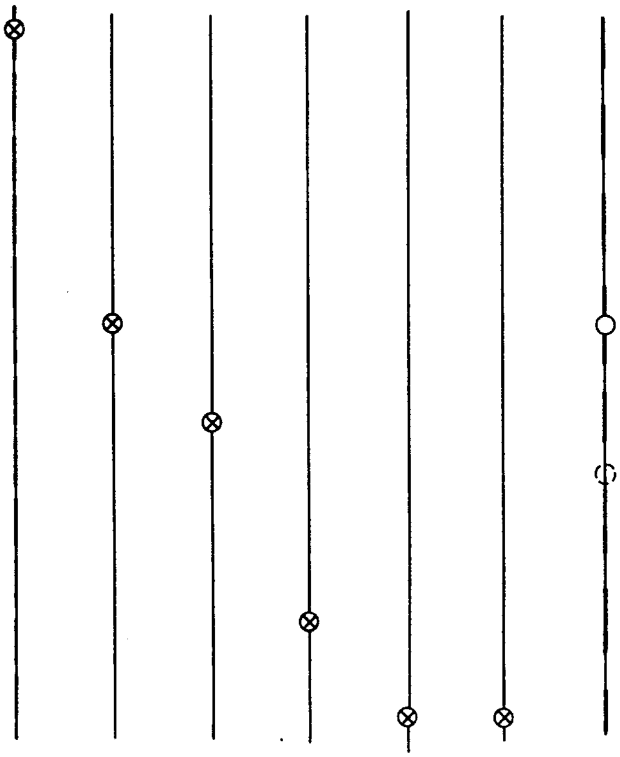
FIG. 19 illustrates how stroke end points (intercept values) are determined by averaging from encoded character data.

Below a certain point set width, an averaging technique may be used to reduce the amount of data. For small sizes, the amount of digitized data will be in excess of that required. To utilize all this information the code converter may produce intercept values that are the arithmetical average of the digitization values between output scan lines, as shown in FIG. 19. In this figure, the continuous lines are the original digitization resolution and the dashed lines are the scan lines selected for output. A "0" indicates a digitization point derived from vector decoding, an "X" indicates a value used to calculate the average and a dashed "0" is the averaged output value of the code converter. As may be seen, the output value is calculated from all intermediate digitization points as well as that of the previous output line. This averaging technique results in a displacement of the character by approximately half an output scan resolution unit to the right.

Figure 20:
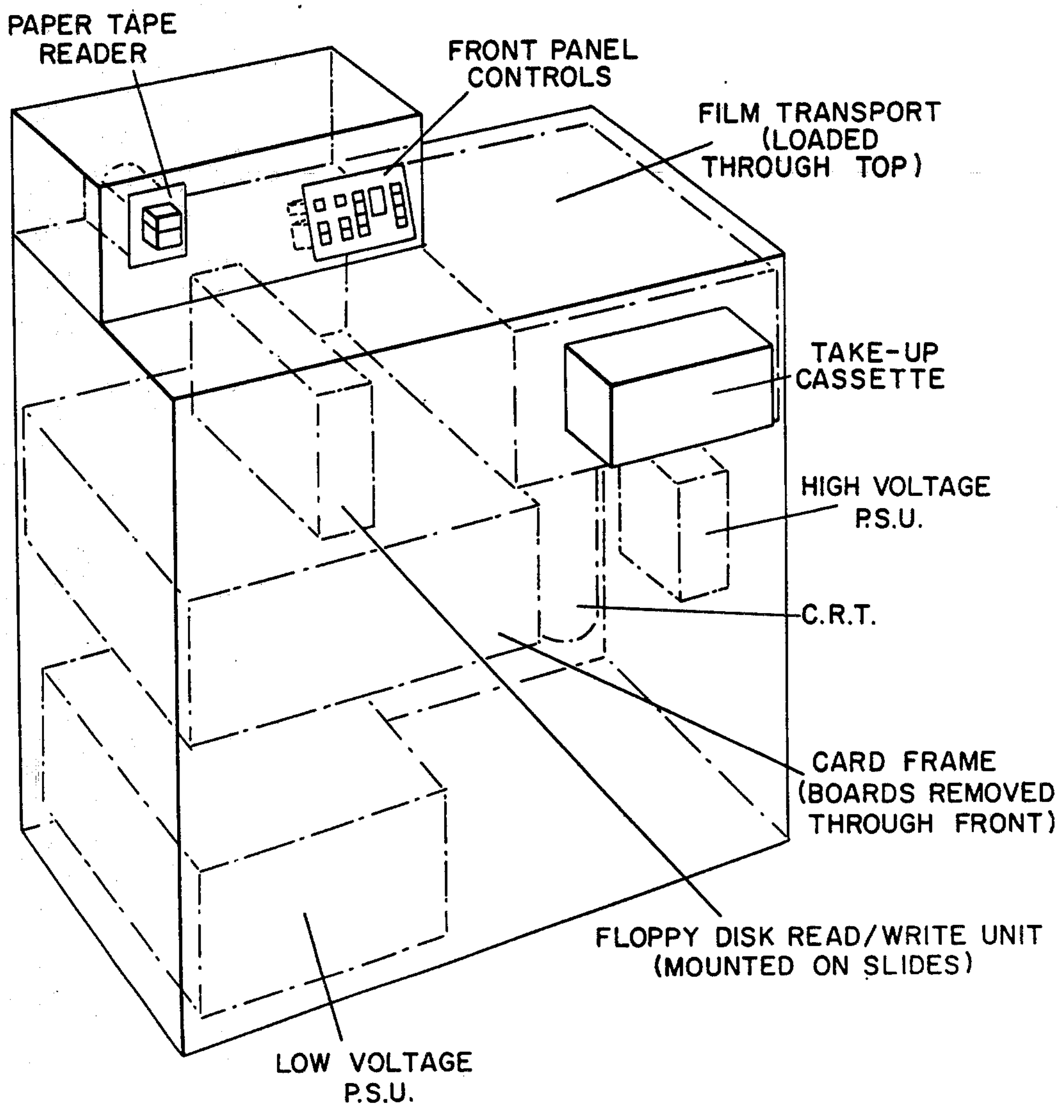
FIG. 20 is a perspective view of a CRT typesetter with various elements shown in phantom.

FIG. 20 illustrates a third generation (CRT) typesetter which may be designed to accept digitized fonts encoded in accordance with the present invention. This machine comprises one or more floppy disk read/write units (mounted on slides for ease of removal), a card frame containing a number of electronic boards, a cathode ray tube, a high voltage power supply unit for this CRT, and a photosensitive film transport mechanism for passing film past the face of the CRT into a take-up cassette. The typesetter also includes the usual front panel controls and a paper tape reader.

Figure 21:
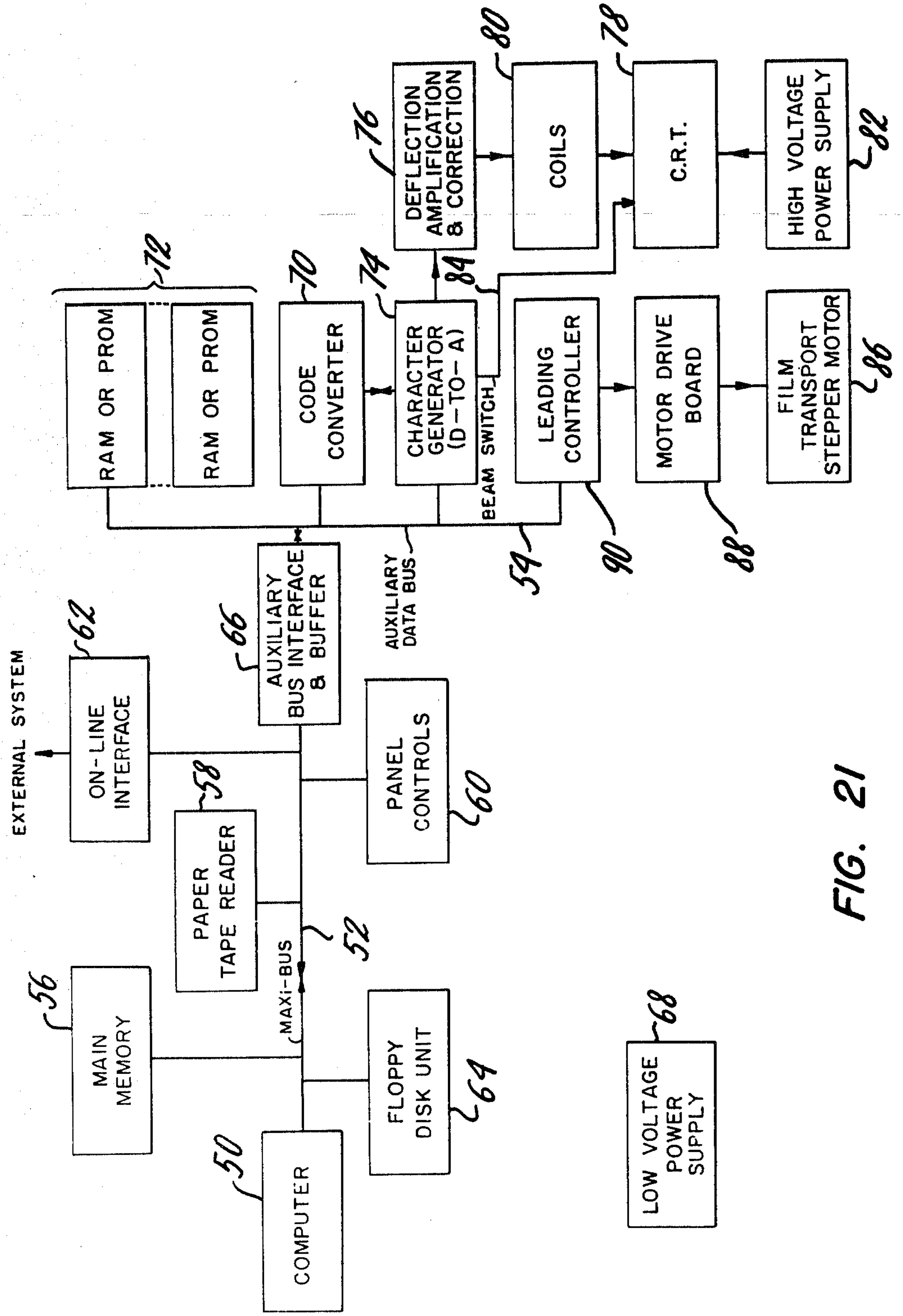
FIG. 21 is a block diagram of the elements of the typesetter shown in FIG. 20.

FIG. 21 shows how the various elements of the typesetter are interconnected. All of these elements are standard, well-known devices with the exception of the code converter and character generator which will be described in detail below.

The system is controlled by a central processor unit 50 (an L.S.I. 3/05 Naked Milli Computer, produced by Computer Automation) either directly via its own data bus (maxibus) 52 or indirectly via a special data bus (auxiliary bus) 54. The system operation is determined by a program resident in a main memory 56 attached to the maxibus which may have up to 32K×16 bits of storage.

Operating instructions for the machine are received from three possible sources: a 300 C.P.S. paper tape reader 58, front panel control 60, and an on-line interface 62. All of these elements are connected on the maxibus 52 as is a floppy disk read/write unit 64 which supplies the digitized fonts.

An auxiliary bus interface and auxiliary bus buffer 66 control the components attached to the auxiliary bus 54. The interface and control 66 is, in turn, controlled by the CPU 50 via the maxibus 52.

A low voltage power supply 68 is connected to all of the electronic circuit boards to power and logic circuitry.

The components attached to the auxiliary bus 54 are responsible for the generation of characters. The code converter 70 extracts condensed font data from a RAM or PROM font store 72 and processes it into an expanded, intercept format. A character generator 74 receives this data and produces a beam switch signal on line 84 and analog voltages representing X and Y deflections on a cathode ray tube. These analog voltages are amplified by video deflection amplifiers 76. Correction circuits in these amplifiers modify the analog signals to correct for the CRT geometry. The characters are finally produced on a CRT 78 using electromagnetic deflection coils 80. The CRT beam is switched on and off at the appropriate moments during scanning by the signal received on line 84 from the character generator 74. The electron beam is accelerated within the CRT by a high voltage provided by the high voltage power supply 82.

Photosensitive paper or film is in contact with the CRT face, so that latent images are formed of the characters. A mechanical film transport 36 advances the paper after each line of characters is complete. A stepper motor of the film transport receives power from a motor drive board 88 which is controlled by a leading controller board 90 attached to the auxiliary bus 54. The paper is fed into a light-tight take-up cassette which holds the paper until it is developed. The paper is cut off with an electrically operated knife and then photographically processed.

As noted above, the computer 50 coordinates and controls the functions of the various elements of the system. Initially, the choice of font, point size, characters and character positions are read by the paper tape reader 58 and stored in the main memory 56. Thereafter, the encoded data defining the individual characters of the chosen font are read from a floppy disk by the read/write unit 64 and stored in the RAM 72. As the successive character blocks are read from the floppy disk, they are placed in specific locations in memory so that these blocks may be subsequently addressed as the characters are imaged. The RAM 72 therefore provides ready access to the compressed data defining the characters of a single font.

On instructions from the computer 50, the code converter 70 receives encoded data for a single character on a need-to-know basis from the RAM 72 and calculates the beam switching points for each successive raster line. The code converter also keeps track of, and updates the X and Y raster coordinates. To assist in the calculation of the beam switching points, a programmable read-only memory (PROM) within the converter serves as a look-up table for the slope of each defined vector.

The character imaging system comprising elements 74–90 images successive lines of characters onto the photosensitive film. On instructions from the computer 50 the imaging system advances the film after each line is completed.

As noted above, all of the elements shown in FIG. 21, with the exception of the code converter 70 and character generator 74, are of well known, routine or "off the shelf" designs or components. While the computer 50 is programmed, this software consists essentially of standard data moving and machine control instruction in a given sequence. Consequently, this software is well within the skill of an average programmer.

Character generation operates as follows:

The start point and vector data relating to the part of the character to be imaged in a vertical scan line is addressed (called) from the RAM 72 and is latched into the code converter input buffer. As each scan line is imaged, the sequential data defining start points and vectors for the next following line are called as required. Since the vectors may, and normally do extend in the X direction across a number of vertical scan lines, a new vector is called only if the previously stored vector(s) are not sufficient to define the next scan line.

Figure 22A:
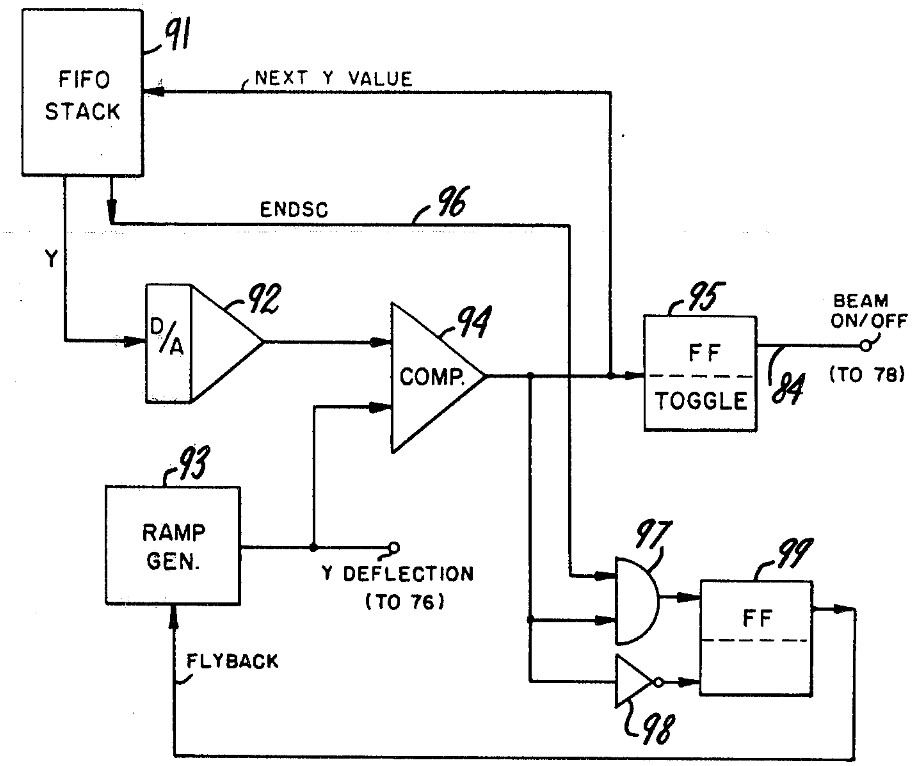
FIGS. 22A and 22B are block and signal diagrams, respectively, showing the structure and operation of the character generator element of FIG. 21.

The calculation of the CRT beam switching points for the next scan line then proceeds, using the slopes stored in the vector slope PROM. As illustrated in FIG. 22A, the Y intercept positions or values at which the beam should be switched from off to on and from on to off are stored in a FIFO (first in, first out) register "stack" 91. The Y intercept values for each scan line are sequentially entered into successive "Y registers" in the stack, the first or lowest Y value being placed in the lowest Y register and successively higher Y values in successively higher registers. The uppermost Y value in the scan line is flagged with an ENDSC bit to indicate that the scan may be reset. The output of the lowest Y register in the stack is converted to an analog value by a digital-to-analog converter 92 in the character generator 74. The character generator also has a ramp generator 93 that produces a uniformly increasing output with time. A comparator 94, connected to change the state of a flip-flop "toggle" 95, turns the CRT beam on or off when the ramp generator output reaches an analog value equal to the D-to-A output, and indexes the stack 91 to call up the next highest Y intercept value. If the ENDSC bit is on when a beam switch occurs so that a signal is present on line 96, the ramp generator 93 will be reset to produce a Y deflection voltage just slightly lower than that of the next following Y intercept value. This avoids excessive flyback and increases the speed of the output. The CRT beam is therefore not reset to the baseline of the character or the base of the em square; rather it is reset to the lowest needed level for the next scan line, and does not have to be driven twice over space where it will not be turned on.

The ramp generator 93 is caused to rapidly reduce its output voltage at a constant rate when a signal is present at its flyback input. This flyback signal remains on until the output of the ramp generator has dropped below the lowest Y intercept value for the next scan line. The fly-back signal is produced by a logic circuit comprising an AND gate 97, inverter 98 and a flip-flop 99 which receive an input from the comparator 94 and the ENDSC signal on line 96.

Figure 22B:
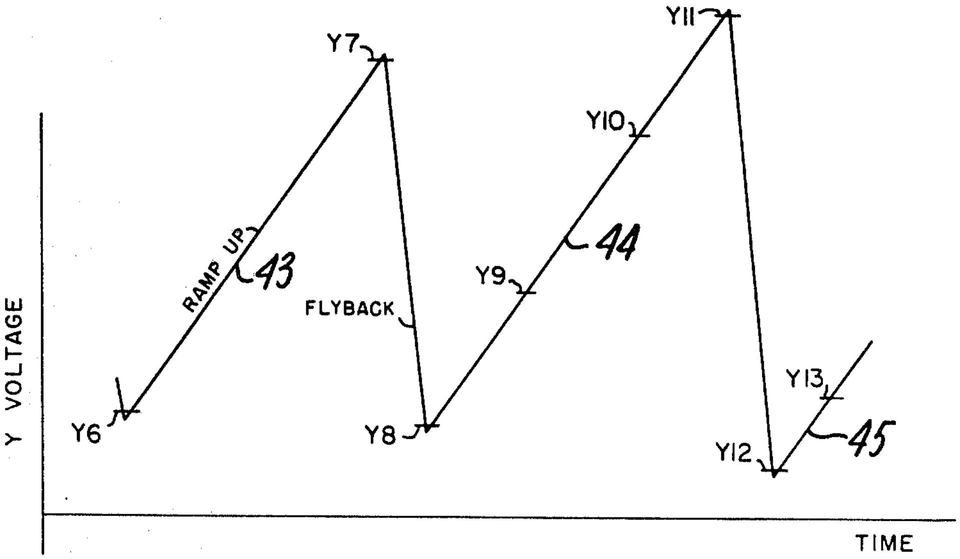

The operation of the flyback logic is illustrated in FIG. 22B. This figure shows the CRT Y deflection voltage produced by the ramp generator 93 for several strokes of the "Q" illustrated in FIG. 15. At the beginning of the first stroke 43, the Y intercept values Y6 and Y7 are entered into the lowest and next lowest Y registers, respectively, in the FIFO stack 91. Because the output of the ramp generator starts at a point slightly below the analog voltage equivalent to Y6, the comparator 94 produces no output. However, when the Y deflection voltage reaches the Y6 value, the comparator 94 produces a signal which switches the toggle 95 from off to on and calls up the next Y value, Y7, in the FIFO stack 91. The Y deflection voltage continues to ramp up until it reaches a voltage equivalent to Y7. Because the next Y value, Y8, is considerably lower than the Y deflection voltage, the comparator 94 continues to produce a signal until the ramp generator output has been reduced. Since an ENDSC bit is associated with Y7, a signal is present on line 96. The output of the comparator 94 and the signal on line 96 trigger the AND gate 97 and set the flip-flop 99 to produce a flyback signal. When the output of the ramp generator 93 has fallen below the Y value, the output of the comparator 94 drops and resets the flip-flop 99 through the inverter 98. This removes the flyback signal and allows the ramp generator to ramp up on the stroke 44. The Y deflection voltage will promptly reach the Y8 value, causing the comparator 94 to again produce an output signal which switches the beam from off to on. The beam is switched off again when the Y deflection voltage reaches Y9, switched on when it reaches Y10 and switched off again when it reaches Y11. Since an ENDSC bit is associated with Y11, the flyback process is repeated to commence the stroke 45.

From this description of the operation, it will be understood that the lower and upper limits of beam travel in any particular stroke approximately correspond with the lowest and highest Y intercept values in that stroke; that is, the lower and upper limits of the character intersections.

Figure 23:
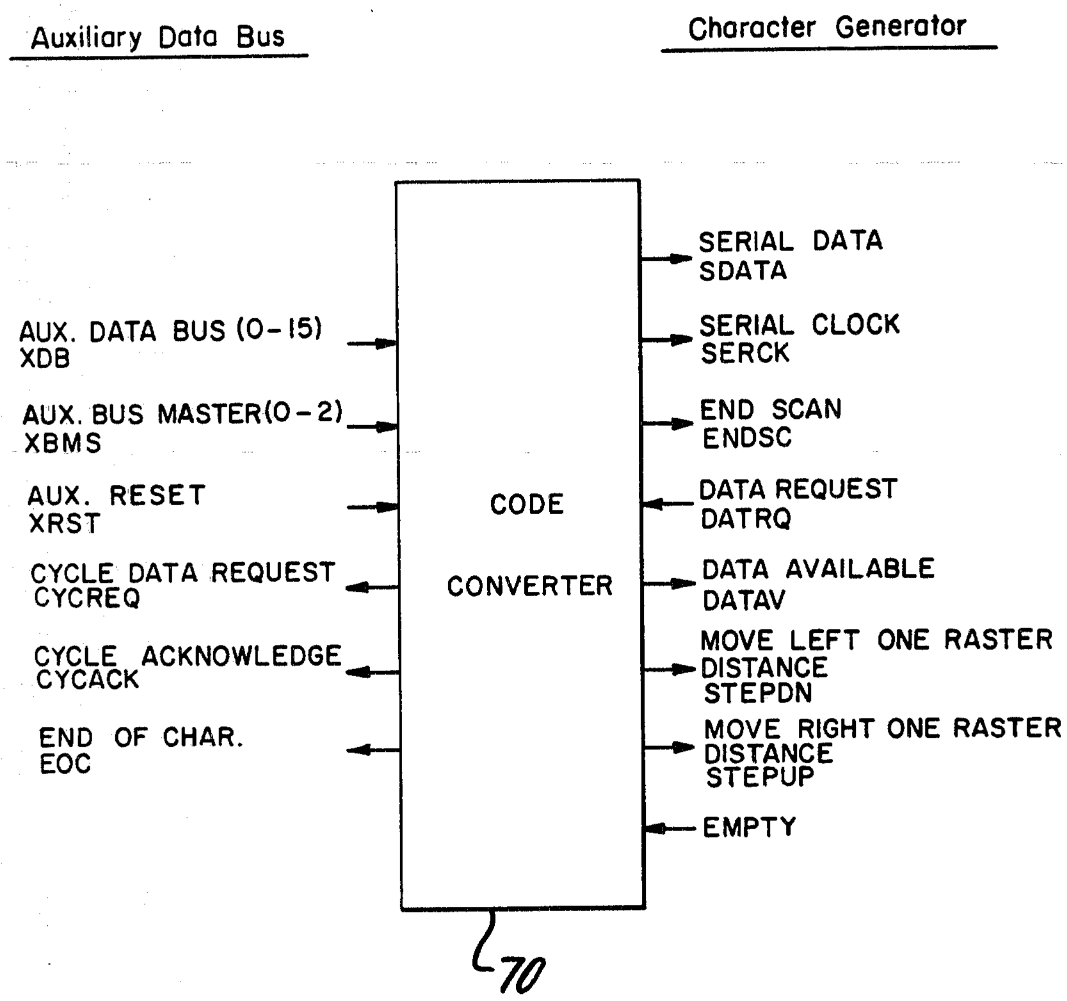
FIG. 23 shows the code converter element of FIG. 21 with its various inputs and outputs.

FIG. 23 specifies the various inputs and outputs of the code converter 70. The signals to and from the auxiliary data bus 54 are shown on the left, and the signals to and from the character generator 74 are shown on the right. These signals are defined as follows:

| | |
|---|---|
| XDB | 16 bit data word defining the character to be imaged are received in parallel from the RAM 72. |
| XBMS | 3 control inputs, whose states are determined by the computer 50, initiate and control operations in the code converter. |
| XRST | A signal control input, originating from the computer 50, is used to totally reset the code converter irrespective of the states of any other signals. |
| CYCREQ CYCACK | Data input occurs upon receipt of an XMBS signal. The code converter then assumes control of the handshake and supplies a signal on CYCREQ whenever it requires a data word. The word is latched when the data source responds with a signal on CYCACK, and the CYCREQ signal is dropped, |
| EOC | When the code converter has completed processing a character it assumes an idle state until the character generator sends a signal on EMPTY. The code converter then supplies the signal on EOC until the XBMS signal, indicating data input, is removed. |
| SDATA | 11 bit data words representing intercept values or beam switch points are passed to the character generator in serial form. |
| SERCK | The code converter generates a 5 MHz. clock signal, which is supplied to the character generator to synchronize the bits in the output data word (SDATA). |
| ENDSC | If the outpt data word referred to the highest outline curve of the character at that point, a signal is passed to the character generator 74 on this line to end the scan (stroke). |
| DATRQ DATAV | The character generator requests data by supplying a signal on DATRQ. The code converter responds with a signal on DATAV when an output data word is available. The data bits are then transmitted on SDATA through the next 11 clock cycles and the signal on DATAV is droppped. |
| STEPDN STEPUP | The "white space" at the leading edge of a character is scaled by the code converter. The width of the space is transmitted to the character generator as a series of pulses. Each pulse corresponds to a movement of one line scan (stroke). The side bearing may be moved away from or toward the previous character. The width of the space and the direction are specified in the character data. Pulses appear on STEPUP for an increasing side bearing and STEPDN for a kerned character. The pulses occur at the beginning of the character processing before any |

-continued

| | |
|---|---|
| | data words are presented to the character generator. |
| EMPTY | The character generator supplies an EMPTY signal when its output buffer is empty. This is used by the code converter to determine when a character has been completely drawn. |

Figure 24:
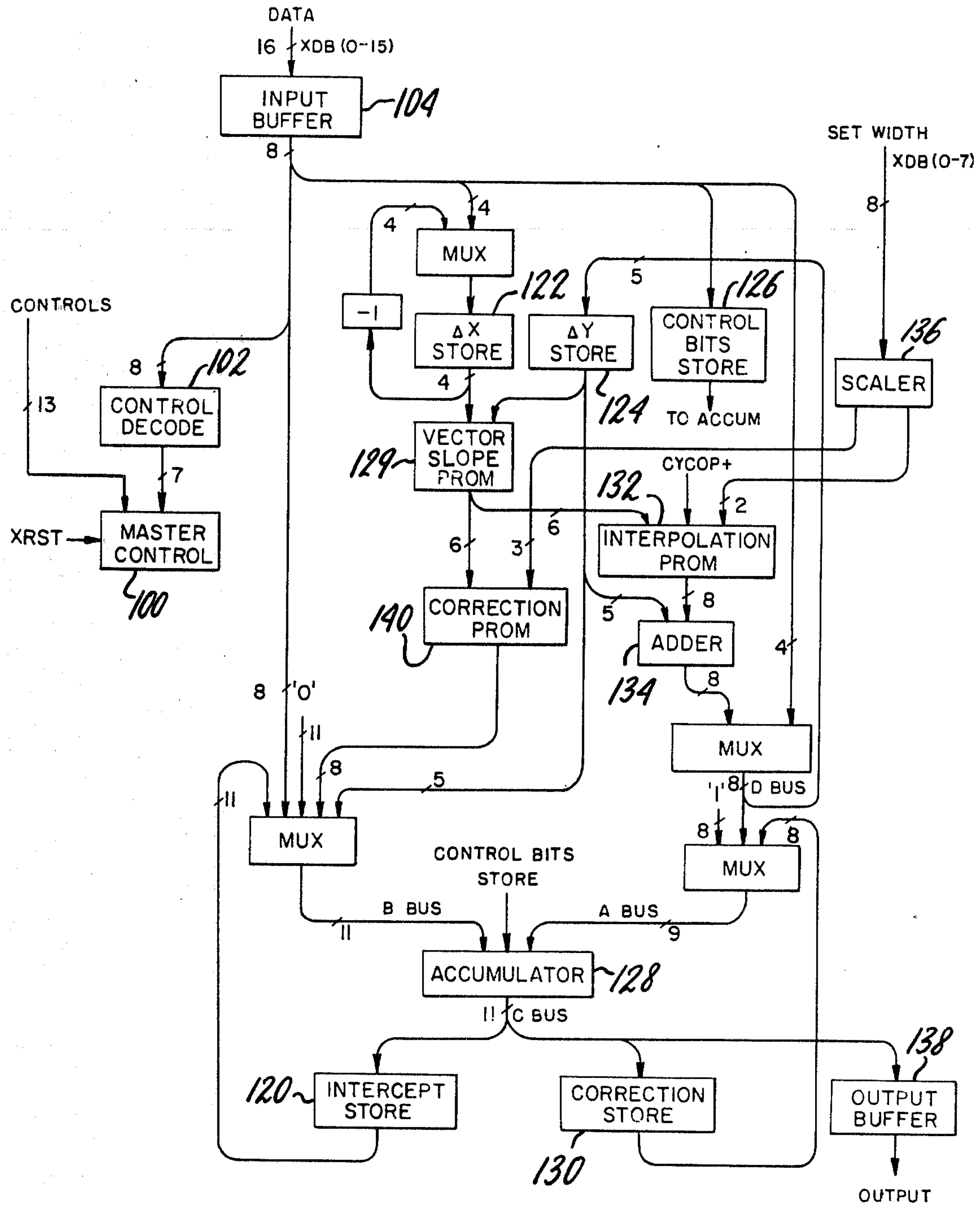
FIG. 24 is a block diagram of the elements of the code converter shown in FIGS. 21 and 23.

FIG. 24 is a block diagram showing the elements of the code converter. The element 100, indicated as the "master controller", is broken down in FIG. 25. The controller 100 receives 16 inputs from a control decoder 102 and four inputs corresponding to XBMS (signals 0, 1, 2) and XRST. The decoder 102 generates the 7 control inputs from 8 signals, representing start words and control bytes, received from an input buffer 104. Data is latched into the inut buffer from the 16 XDB lines.

Figure 25:
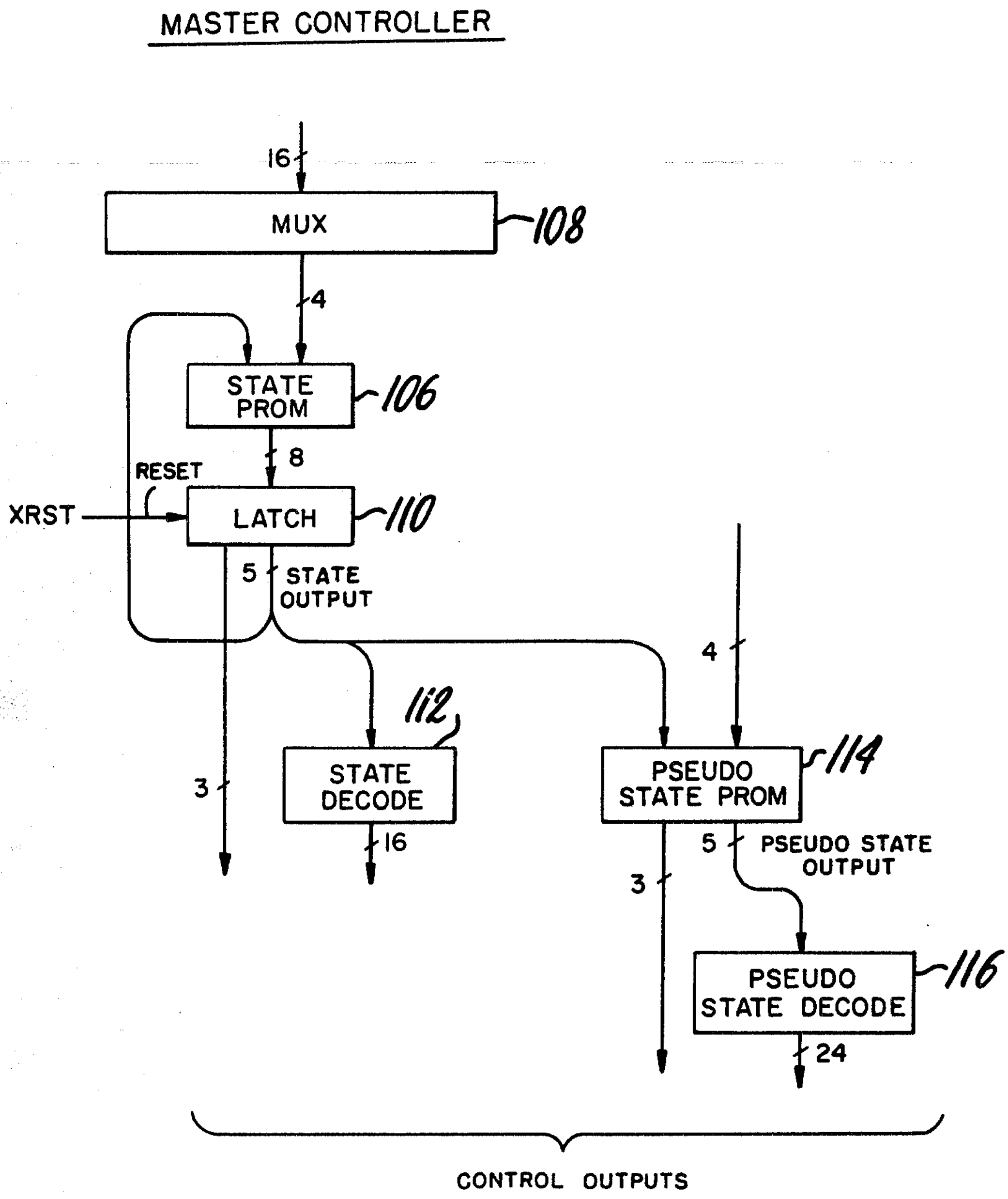
FIG. 25 is a block diagram of the master controller element of the code converter shown in FIG. 24.

The master controller, shown in FIG. 25, generates 46 output signals for controlling the operation of the code converter. These signals are applied to the various logic elements of the converter, in a known manner, to gate and latch the signals in a prescribed sequence. The controller comprises a state PROM 106 which determines the next state of the code converter from the current state and the conditions on 16 control inputs. The state PROM is addressed by 4 signals received from a multiplexer 108 and 5 signals received from a latch 110. The output of the state PROM is supplied to the latch 110 which, in turn, is connected to a state decoder 112 and a "pseudo" state PROM 114.

The pseudo state PROM 114 is capable of modifying its output state during a processor cycle if the current state and its control inputs force it. In addition to the state output from the latch 110, the pseudo state PROM receives the 4 control signals principally from the decoder 102. Of the 8 outputs of the pseudo state PROM 114, 5 are decoded by a pseudo state decoder to produce 24 control outputs.

Vector Processing: Five parameters are stored for vector processing. These are:

(1) Intercept value (11 bits): The intercept value, which is stored in the intercept store 120, is the Y value of successive vector ends around an outline. Thus:

| | | |
|---|---|---|
| $Y_o$ | = | $\Delta Y$ start point ($\Delta X_N$, $\Delta Y_N$ is the Nth vector) |
| $Y_1$ | = | $Y_o \pm \Delta Y_o$ |
| $Y_2$ | = | $Y_1 \pm \Delta Y_1$ |
| | | . |
| | | . |
| | | . |
| $Y_N$ | = | $Y_{N-1} \pm \Delta Y_{N-1}$. |

(2) ΔX value (4 bits): The ΔX value, which is stored in the ΔX store 122, is the horizontal distance from the right-hand end of the current vector. Thus, for successive grid line calculations:

| | | | |
|---|---|---|---|
| $\Delta X$ | = | $\Delta X_N$ (new vector starts here) | |
| $\Delta X$ | = | $\Delta X - 1$ | post decremented |
| $\Delta X$ | = | $\Delta X - 1$ | |
| | | . | |
| | | . | |
| $\Delta X$ | = | 1 (end of vector). | |

(3) ΔY value (5 bits): The ΔY value, which is stored in the ΔY store 124, is the approximate vertical distance from the right-hand end of the current vector. The four most significant bits are taken as the input $\Delta Y_N$ value and the least significant bit is introduced by a look-up table to improve accuracy.

(4) Sign Bit (1 bit): The sign bit, which is stored in the control bits store 126, is 0 for a vector in one (e.g., the upper) quadrant and one for a vector in the other (e.g., lower) quadrant.

(5) Valid Bit (1 bit): The valid bit, which is stored in the control bits store 126, is 0 for an intercept value, which is a new start point Y value without any vector modification, and one for a modified intercept value which may be used for calculating an output value.

With the exception of the A, B and C bus loops which include the intercept store 120, an accumulator 128 and a correction store 130, the sign is ignored and positive values only are considered. The sign bit is introduced at the accumulator where appropriate.

Figure 26:
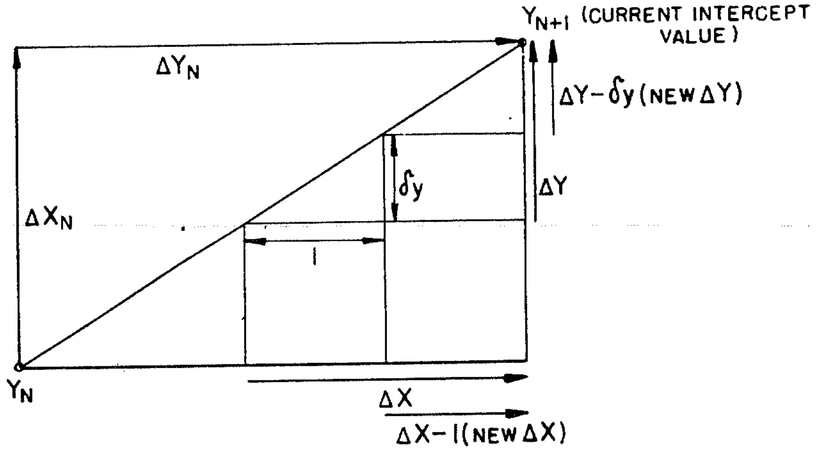
FIG. 26 is a geometric diagram illustrating the vector computation process carried out by the code converter.

Computation begins with a start point Y value loaded into the intercept store 120 and the ΔX store 122 holding the displacement to the beginning of the first vector, and with the valid bit set at zero. As each grid line is processed, the ΔX store is decremented; when it reaches "1", it signals for a vector byte. The intercept store 120 is updated with the ΔY value and ΔX and ΔY are stored. The valid bit is set to 1 making the data available for output. This computation process is illustrated in FIG. 26. At subsequent grid lines, the ΔX store 122 is decremented and ΔY is reduced by the output of a vector slope PROM 129. The PROM is addressed by ΔX and ΔY and outputs a normalized ΔY value, δy. δy is inverted by an interpolation PROM 132 which in this mode is only acting as a complementing buffer. This output is then added to ΔY by an adder 134 and restored in the ΔY store 124.

All the code converter stores are configured from 16 deep random access memories. The RAMs are addressed in parallel from a 4 bit by 16 deep FIFO register as shown in FIG. 20. This register contains the RAM addresses for the current outlines in order of increasing intercept value. The FIFO is normally operated with its outputs connected to its inputs thereby recirculating the addresses. For every vector processing operation an address is clocked into the output register of the FIFO and the previous address is loaded into the FIFO input.

New addresses at start points may be introduced into the loop from the new address counter and added to the FIFO stack. At end outline points the address is not reloaded into the FIFO and so is deleted from the stack.

Initially the 4 bit new address counter is set to a maximum count of 15 and it is decremented as each start point occurs. Every RAM location which contains outline information (i.e., the address, occurs within the FIFO stack) has the "not vacant bit" set to a one. The not vacant bit (1 bit), which is stored in the control bits store 126, is 0 for an empty RAM location and one for an occupied location. An end outline control code causes the not vacant bit to be returned to a 0.

When 16 outlines occur in one character, the new address counter will have decremented to zero. Any further start points must be preceded by at least an equal number of end outline codes since no more than 16 outlines may be processed at one time by the code converter. On receipt of such a start outline code the master controller sequentially addresses the RAM locations, by decrementing the new address counter, until an address with the not vacant bit set to 0 is found. This address is then entered into the FIFO stack and used for the new outline.

The FIFO may consequently hold a variable length stack of non-sequential values which correspond to the RAM addresses of the current outlines. The order in which start pont codes and vector codes occur in the character data ensure that the addresses are entered into the stack and so presented to the RAMs in the correct order to provide increasing intercept values on output.

The lowest outline latch is a 4 bit register which holds the RAM address value of the current lowest outline. It is up-dated when outlines are started below the existing ones or when the existing lowest outline is ended and the next highest becomes the lowest. The latch output is continuously compared with the current RAM address and when they are identical a control signal is sent to the master controller indicating that a scan line has just been completed.

This RAM addressing system provides a very fast and flexible method of cyclically processing a variable number of outlines while maintaining a correct sequence with no overheads a line ends.

Scaling: A value representing the character set width in points is loaded into a scaler 136 before vector processing is commenced. The job of the scaler is to horizontally scale the character by determining the point at which Y values should be passed to the output buffer 138 for serial transmission to the character generator. The scaler 136 informs the master controller 100 whether to compute the next grid line values or to output the current Y values. If Y values are to be placed in the output buffer, it supplies either the interpolation address, or the averaging scaling factor as will be explained below.

The scaler operates at a much higher resolution than the rest of the code converter to ensure high accuracy. It uses 16 times the resolution of the vectors which is 4 times the resolution necessary to interpolate the vectors for large point size expansions. If the vector resolution is X lines/cm, the scaler works at 16X lines/cm. To produce a character at a certain output size with a fixed output stroke resolution may require W lines/cm. Thus the scaler is approximating to the fraction 16X/W which corresponds to the number of scaler lines between each required output line. This is achieved by repeatedly selecting the integer below 16X/W and the integer above 16X/W alternately for differing numbers of times. A four phase cycle is used with each integer occurring twice with a differing number of repeats in each phase. If the numbers of repeats are represented by the numbers $N_0$, $N_1$, $N_2$ and $N_3$ and the integer below 16X/W by M, then the approximation can be stated as:

$$\frac{16X}{W} = \frac{(N_0 \times M) + (N_1 \times (M+1)) + (N_2 \times M) + (N_3 \times (M+1))}{N_1 + N_2 + N_3 + N_4}$$

A special case occurs when 16X/W is itself an integer so only a single integer is used and the number of repeats is irrelevant.

Figure 30:
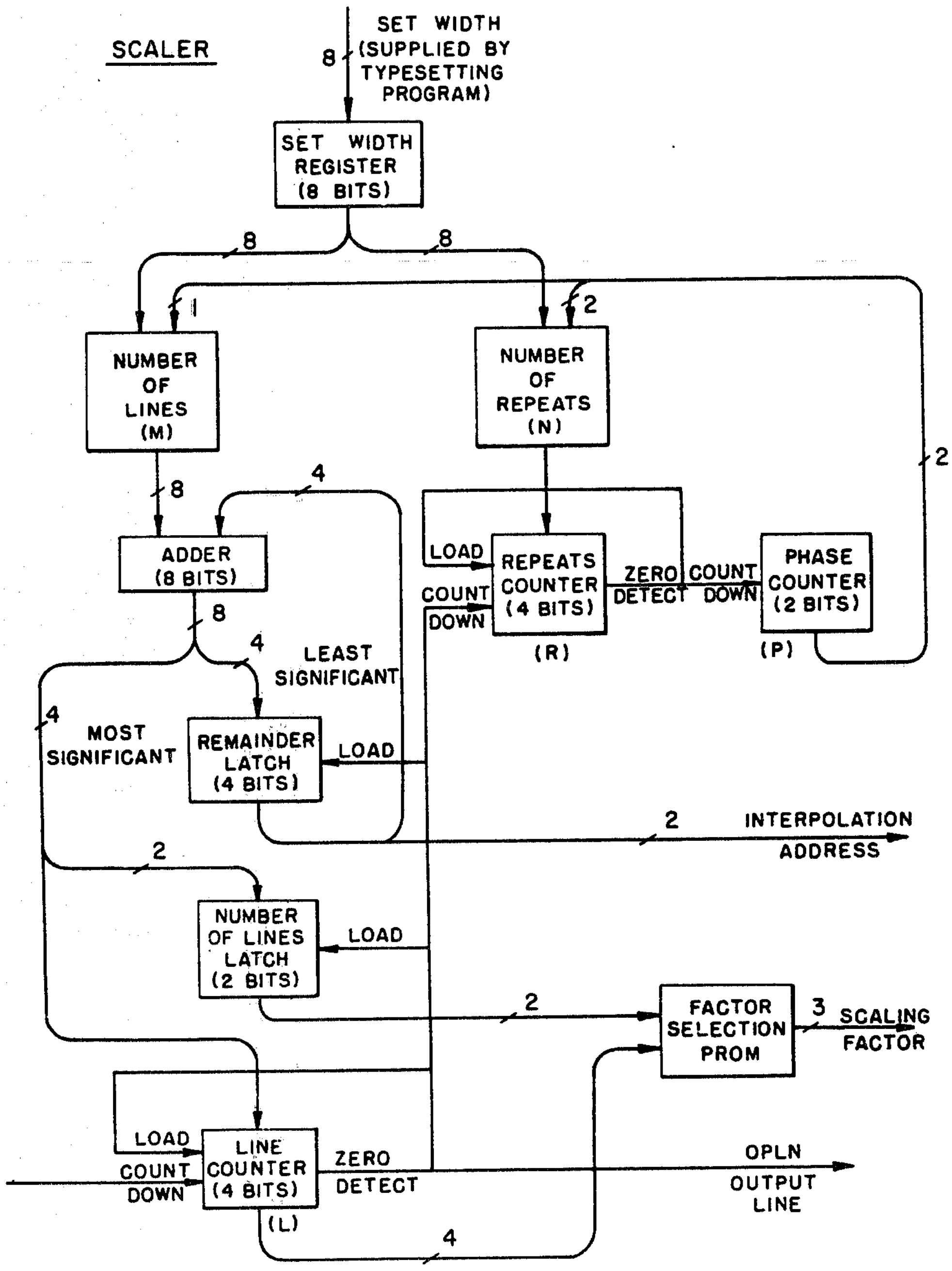
FIG. 30 is a block diagram of the scaler element of the code converter.

The detail of the scaler is shown in FIG. 30. The set width register holds the constant value of width supplied by the computer. This is used to address two PROM look up tables. One contains the numbers of lines (M) between each output line which are the integers below and above the required fraction. The least significant of the two bits which define the phase number (P) is used in the address to select between the two integers for each set width value. The other table contains the numbers of repeats (N). This is additionally addressed by both bits of the phase number allowing different numbers of repeats in all four phases.

The output from the number of lines table is passed through an adder and split with the 4 least significant bits being held in the remainder latch and the four most significant bits being loaded into the line counter. The value (L) in the line counter corresponds to the number of lines at the vector resolution between each successive output since the stripping of the four least significant bits effectively divides by 16. The output from the number of repeats table is loaded into the repeats counter when its count (R) reaches zero. Thus the value stored in the table is one less than the number of repeats required.

Figure 31:
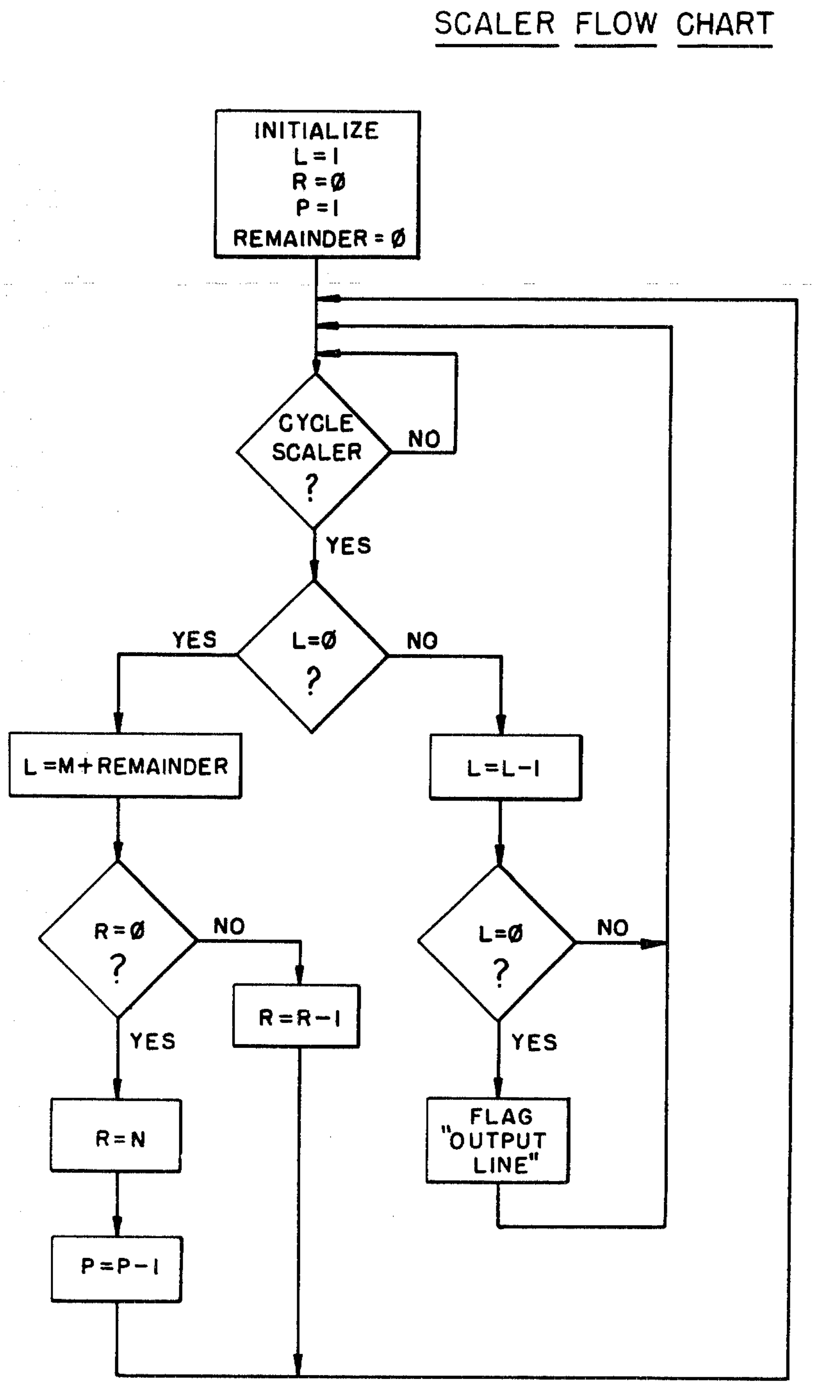
FIG. 31 is another flow chart illustrating the operation of the scaler of the code converter.

The operation of the scaler is shown by the flow diagram FIG. 31. The scaler is initialized at the beginning of each character and thereafter it is triggered into individual cycles on demand from the master controller which in turn senses the "output line" control signal.

Figure 27:
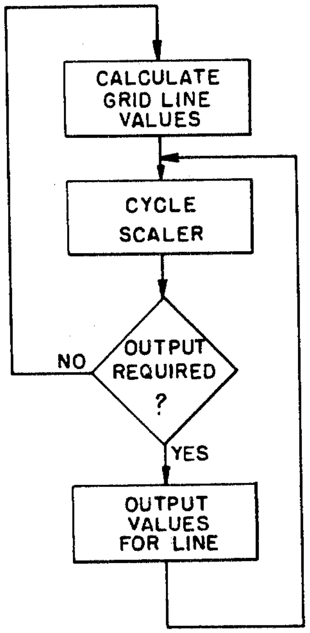
FIG. 27 is a flow chart illustrating the operation of the scaler element of the code converter.

The use of the scaler within the code converter processing operations is shown by the flow chart FIG. 27. The scaler is cycled at the end of processing each grid line of the character and after sending the values for each output scan. The sensed state of the output line signal determines which loop is performed. It follows that every scaler cycle after a grid line calculation decrements the line counter and every scaler cycle after an output operation loads the line counter. At small point sizes the "no" loop is used more often since several grid lines occur between output lines. However, at large point sizes, the "yes" loop is used more often since several output lines occur between grid lines.

The interpolation address is simply supplied by the two most significant bits of the remander latch. This identifies which of the interpolation lines is required.

The averaging scaling factor determines the "weight" applied to δy values in building up the correction term. The weighting depends upon the total number of values to be averaged and which particular δy within the total is being processed. At the small output sizes at which averaging is used a very high accuracy is unnecessary. So only two bits are used to define the total number of values (the line counter input ignoring the least significant bit) and the output of the line counter determines which particular δy is being processed. A PROM look up table is addressed by these six lines and 1 of 8 scaling factors is selected.

Figure 28:
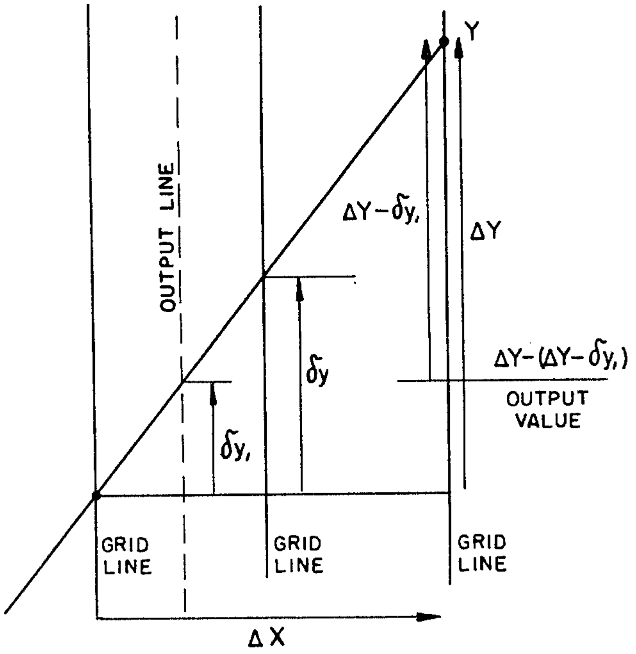
FIG. 28 is a geometric diagram illustrating the interpolation process carried out by the code converter.
Figure 29:
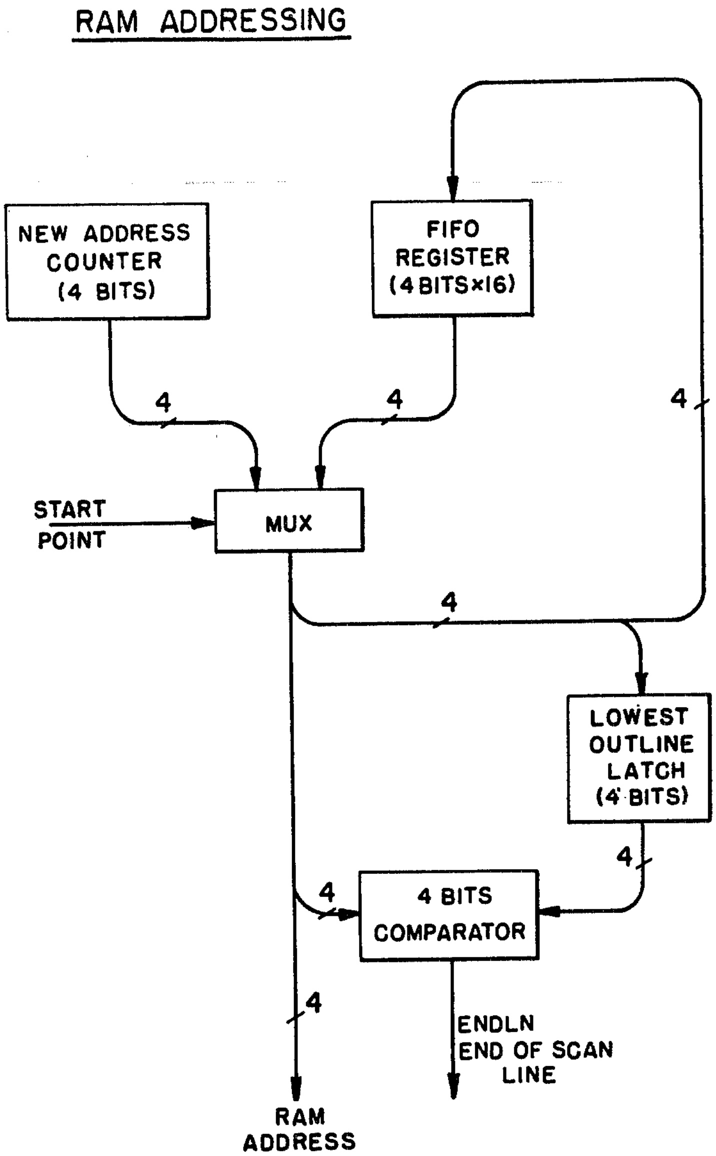
FIG. 29 is a block diagram of the RAM addressing portion of the code converter.

Interpolated Output: At point sizes where interpolation is used, the code converter outputs values calculated from straight line interpolation between grid lines. This interpolation process is illustrated in FIG. 28.

The intercept store 120 holds the absolute Y value of the end of the current vector. A ΔY store 124 holds the difference between the intercept value and the Y value at the last grid line. The scaler 136 provides an interpolation address to the interpolation PROM 132, which is also supplied with δy from the vector slope PROM 129. The output of the interpolation PROM 132, $\delta y_1$, is a proportion of δy appropriate to the interpolation position. This is subtracted from ΔY by the adder 134 and appears on the D bus. It is applied to the accumulator 128 via the A bus and the B bus carries the output of the intercept store 120. The C bus transmits the correct output value to the output buffer 138.

The output buffer holds the calculated value until the character generator signals that it is ready to receive it. The serial transfer is then effected and the next output calculation can begin. If the value transferred is that for the highest current outline the code converter flags the character generator after the transfer on the ENDSC control line.

Averaged output: At small point sizes, where there are more than three grid lines between each output line, an averaging algorithm can be used to calculate output Y values. The correction store 130 is used for this purpose. This store holds a correction value which is applied to the value to the intercept store 120 to produce the output value. The averaging system ignores interpolation line addresses and only outputs on integral grid line values.

The calculation is based on the equation for the arithmetical mean of the values $Y_0$ to $Y_{n-1}$ which is:

$$\frac{\sum_{m=0}^{n-1} Y_m}{n} = [\frac{1}{n}(Y_0 - Y_1) + \frac{2}{n}(Y_1 - Y_2) + \ldots + \frac{n}{n}(Y_{n-1} - Y_n)[ + Y_n$$

The expression in the square brackets is the correction term. The average is worked out by considering the Y values on each grid line and averaging these between output lines. Thus, $n-1$ becomes the number of grid lines between output lines and the different terms are then the $\delta y$ outputs from the vector slope PROM 129.

Figure 32:
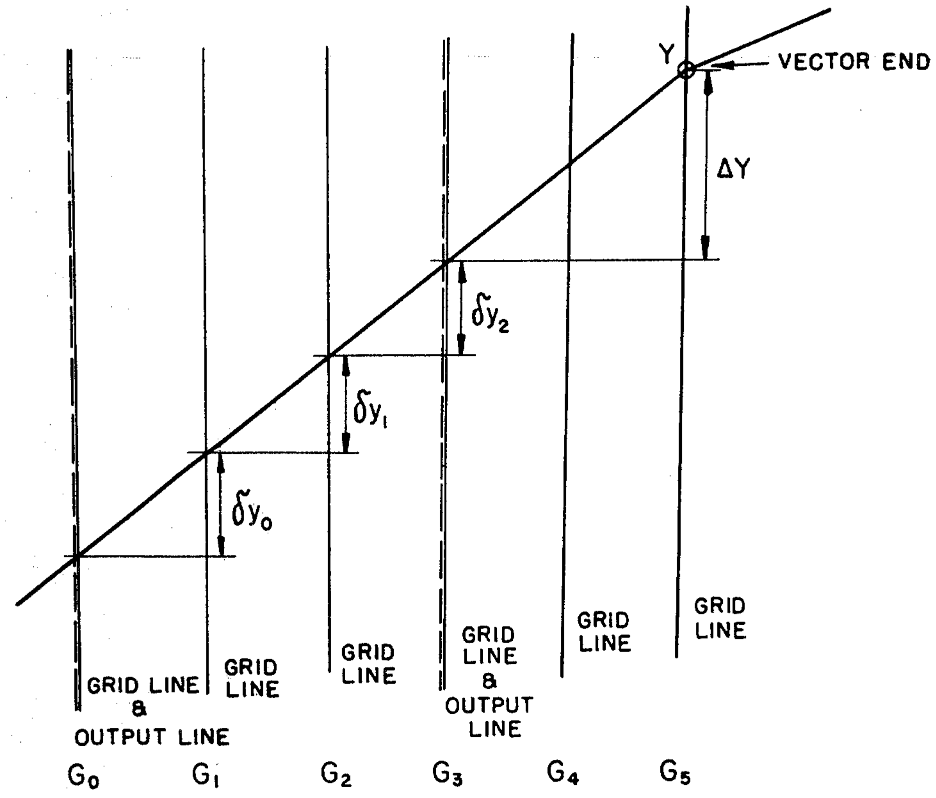
FIG. 32 is a geometric diagram illustrating the averaging process carried out by the code converter.

The application of the equation is illustrated in FIG. 32 where the output line at C3 is to be calculated. The intercept store contains the value Y for the vector end on G5 throughout the operation. Hence:

| | | |
|---|---|---|
| $Y_n$ | = | $Y - \Delta Y$ (intercept store minus. Y store) |
| $Y_o - Y_1$ | = | $\delta Y_o$ (vector slope PROM output on G1) |
| $Y_1 - Y_2$ | = | $\delta Y_1$ (vector slope PROM output on G2) |
| $Y_2 - Y_3$ | = | $\delta Y_2$ (vector slope PROM output on G3) |
| n | = | 3 |

Average Y for lines $G_0$, $G_1$, $G_2 = (\frac{1}{3}\delta y_0 + \frac{2}{3}\delta y_1 + \delta y_2) + (Y - \Delta Y)$ The correction PROM 140 takes the $\delta y$ output of the vector slope PROM 129 and multiplies it by a factor approximately equal to the appropriate preceding fraction. This is selected by a smaller PROM—the factor selection PROM—in the scaler 136 which is addressed by the number of grid lines between output lines (the divisor) and the current line number (the dividend). The three bit code allowing eight scaling factors is output by the factor selection PROM to the correction PROM.

The correction term is built up by adding the output of a correction PROM 140 into the correction store 130. This store is cleared every time there is an output line and then starts building the correction for the next output. The PROM output on the B bus is always added to the correction store output on the A bus by the accumulator 128. The value in the correction store has its sign changed wherever the outline changes its quadrant. The correction store is only eight bits but it ignores the least significant bit of the C bus since at the small point sizes in which it operates such accuracy is unnecessary. Thus it is effectively nine bits and it has an overflow which limits it in the case of very great displacements.

The value held in the intercept store 120 is not usually the Yn of the equation above but is the end of the current vector. So immediately before output, the correction store is adjusted by the current $\Delta Y$ to allow for the discrepancy.

The output value is finally calculated in the accumulator 128 by applying the correction store output on the A bus and the intercept store output on the B bus. The C bus transmits the correct output value to the output buffer 138.

As explained above, the output buffer holds the calculated value until the character generator signals that it is ready to receive it. The serial transfer is then effected and the next output calculation can begin. If the value transferred is that for the highest current outline the code converter flags the character generator after the transfer on the ENDSC control line.

While there has been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. A typesetter for the automatic generation of characters comprising a character imaging system for writing graphics quality characters of any design on a print medium; a font storage system having digital data stored thereon defining each character to be imaged; and an electronic computation and control system, connecting said font storage system with said character imaging system, for controlling said character imaging system in accordance with said digital data;

said character imaging system including a flying spot scanning device for writing characters by means of a plurality of parallel scanning strokes of a scanning beam; and said computation and control system including:

means for producing a beam deflection signal, determinative of the amount of deflection of said scanning beam in the direction of each stroke, said beam deflection signal causing successive strokes of said beam to start substantially at the intercept point on one side of a character and to terminate substantially at the intercept point on the opposite side of said character.

2. The typesetter recited in claim 1, wherein said flying spot scanning device is a CRT.

3. The typesetter recited in claim 1, wherein said computation and control system further includes:

(b) means for randomly accessing said stored digital data and supplying said digital data in sequence; and (c) means, adapted to receive said digital data in sequence, for converting said digital data into character intercept values for each scan line stroke of said scanning device; and means for producing an analog voltage representative of successive intercept values for each scan line;

ramp generator means for producing a ramp voltage of substantially constant slope, said ramp generator means having a reset input causing said ramp voltage to rapidly return to a given value; and means responsive to said analog voltage producing means and to said ramp generator means for applying a flyback signal to said reset input, said flyback signal causing said ramp voltage to return to said given value.

4. The typesetter recited in claim 3, wherein said given value of said ramp voltage corresponds to the lowest intercept value for the next successive scan line.

5. The typesetter recited in claim 1, wherein said means for applying a flyback signal includes:

(i) comparator means connected to said analog voltage producing means and to said ramp generator means for producing an output signal when the inputs thereto are substantially equal;

(ii) logic means, connected to said comparator means, for generating a flyback signal when said ramp voltage is substantially equal to the analog voltage representative of the last intercept value for a scan line and for maintaining said flyback signal unti said ramp voltage has fallen to a value corresponding to the lowest intercept value for the next successive scan line.

* * * * *